Figure 1:
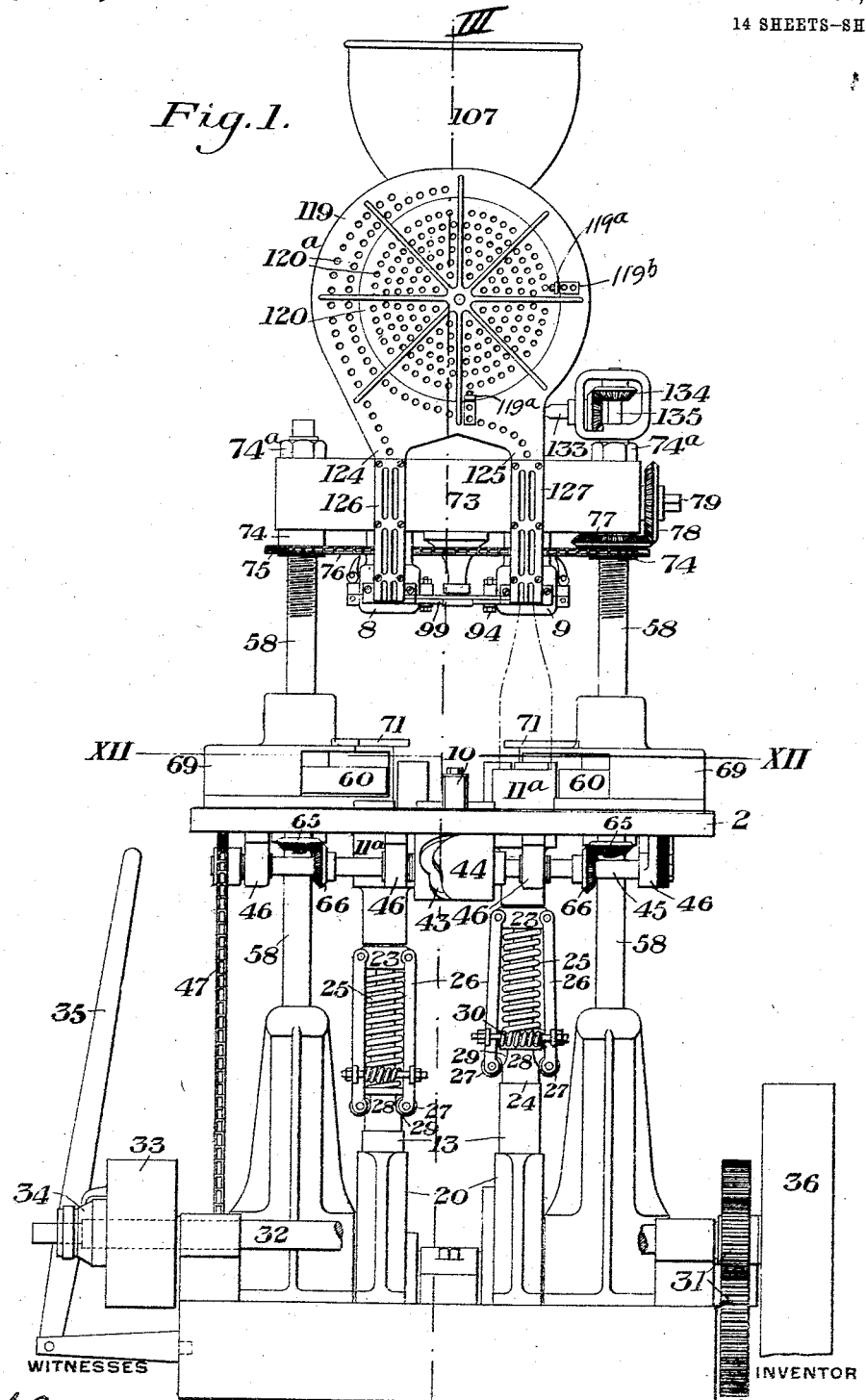

E. P. WETMORE.
BOTTLE CAPPING OR SEALING MACHINE.
APPLICATION FILED JUNE 5, 1909.

1,021,565.

Patented Mar. 26, 1912.

14 SHEETS—SHEET 1.

WITNESSES
R. A. Balderson
G. L. Winters

INVENTOR
E. P. Wetmore
by Bakewell, Byrnes & Parmelee
his Attys

E. P. WETMORE.
BOTTLE CAPPING OR SEALING MACHINE.
APPLICATION FILED JUNE 5, 1909.
1,021,565.
Patented Mar. 26, 1912.
14 SHEETS—SHEET 3.
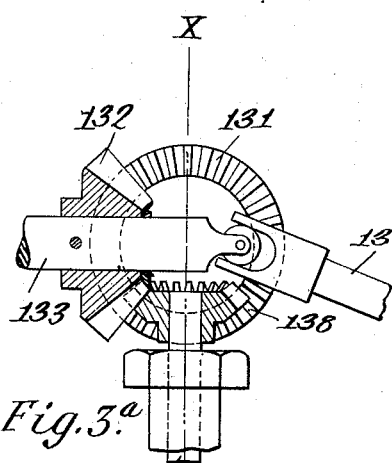
Fig. 3.
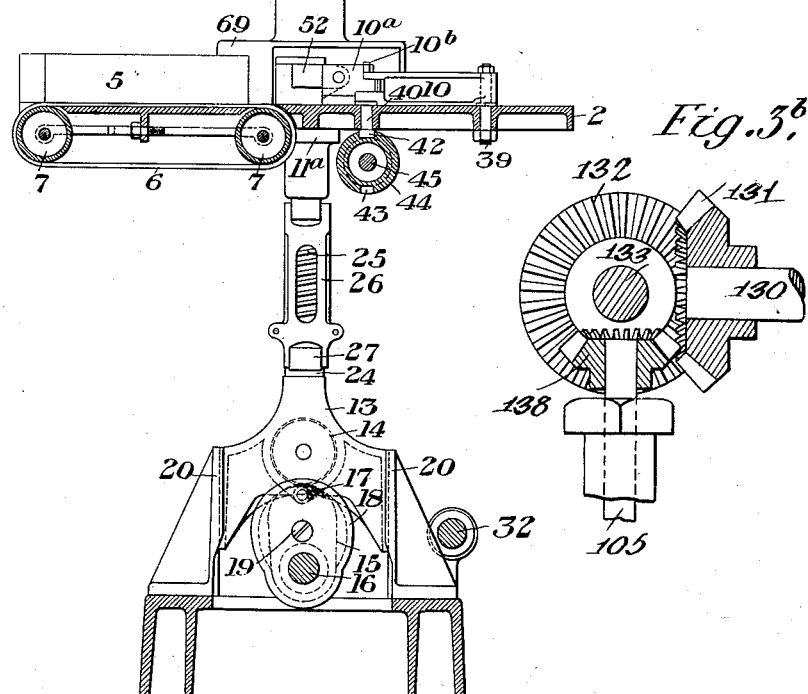
WITNESSES
R A Balderson
G L Winters
INVENTOR
E. P. Wetmore
by Bakewell, Byrnes & Parmelee,
his Attys.

E. P. WETMORE.
BOTTLE CAPPING OR SEALING MACHINE.
APPLICATION FILED JUNE 5, 1909.

1,021,565.

Patented Mar. 26, 1912.
14 SHEETS—SHEET 6.

Fig.6.ª

WITNESSES
INVENTOR
E. P. Wetmore

E. P. WETMORE.
BOTTLE CAPPING OR SEALING MACHINE.
APPLICATION FILED JUNE 5, 1909.
1,021,565.
Patented Mar. 26, 1912.
14 SHEETS—SHEET 7.
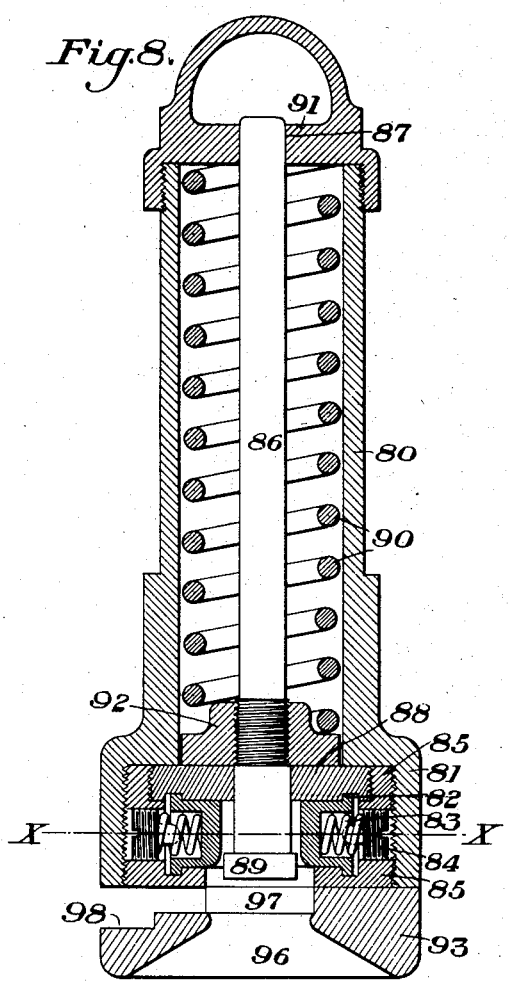
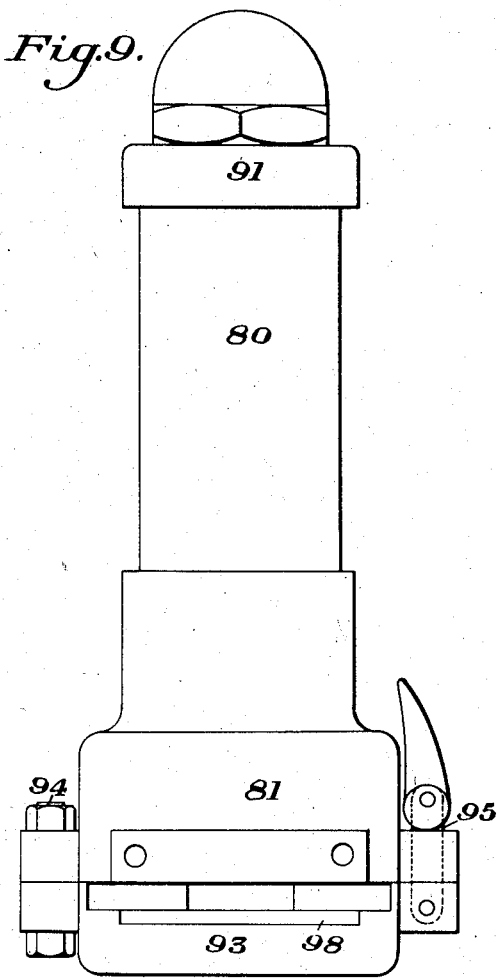
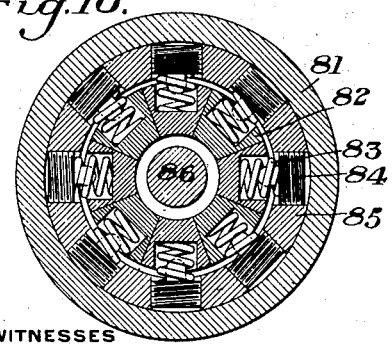
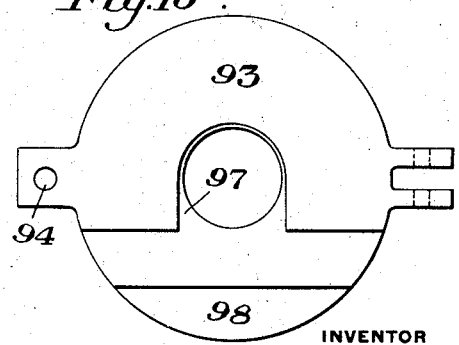
WITNESSES
R. A. Balderson
G. L. Whiters
INVENTOR
E. P. Wetmore,
by Bakewell, Byrnes & Parmelee
his Atty's.

E. P. WETMORE.
BOTTLE CAPPING OR SEALING MACHINE.
APPLICATION FILED JUNE 5, 1909.
1,021,565.
Patented Mar. 26, 1912.
14 SHEETS—SHEET 8.
*Fig. 11*
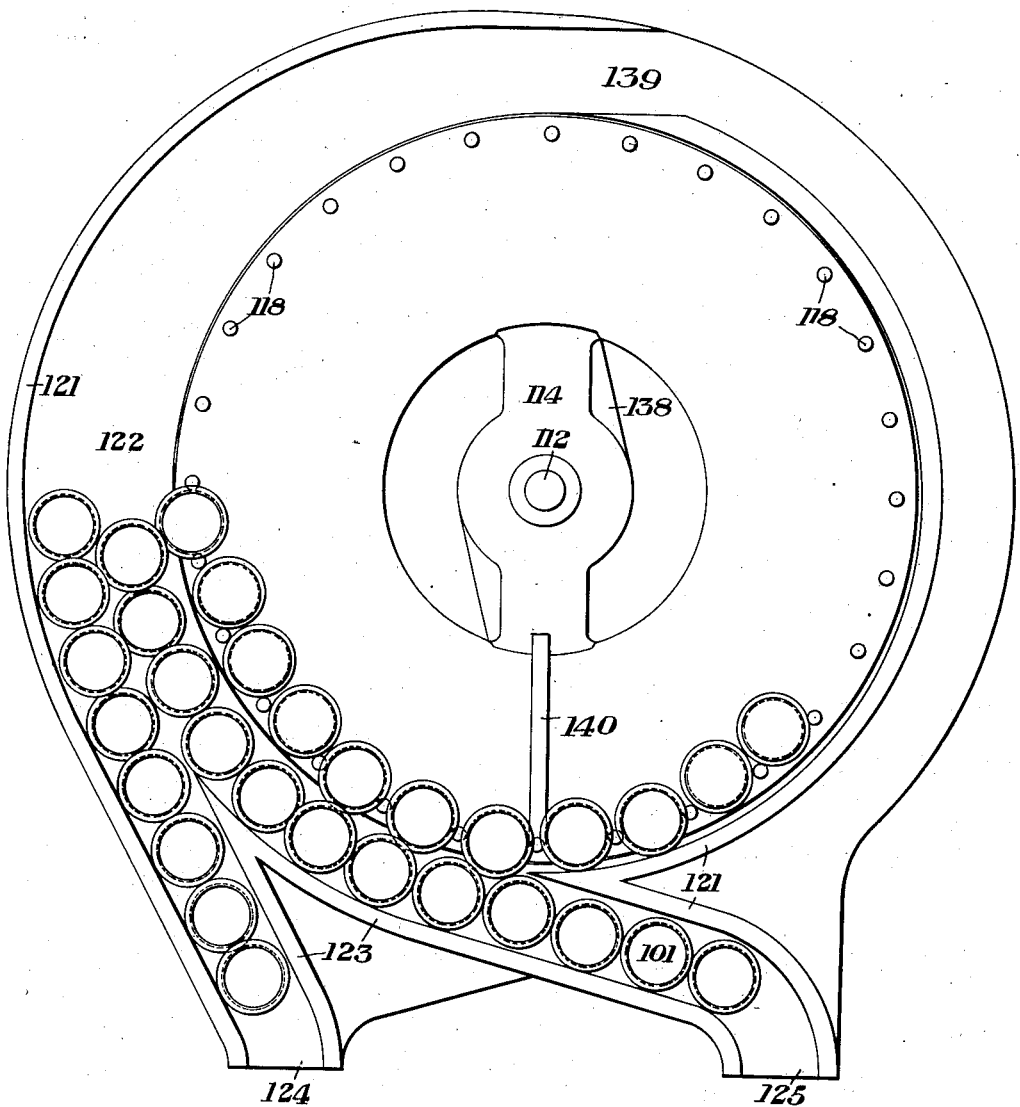
*Fig. 11ª.*
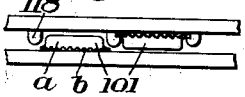
WITNESSES
R A Balderson
G L Winters
INVENTOR
E. P. Wetmore,
by Bakewell, Byrnes & Parmelee,
his Attys

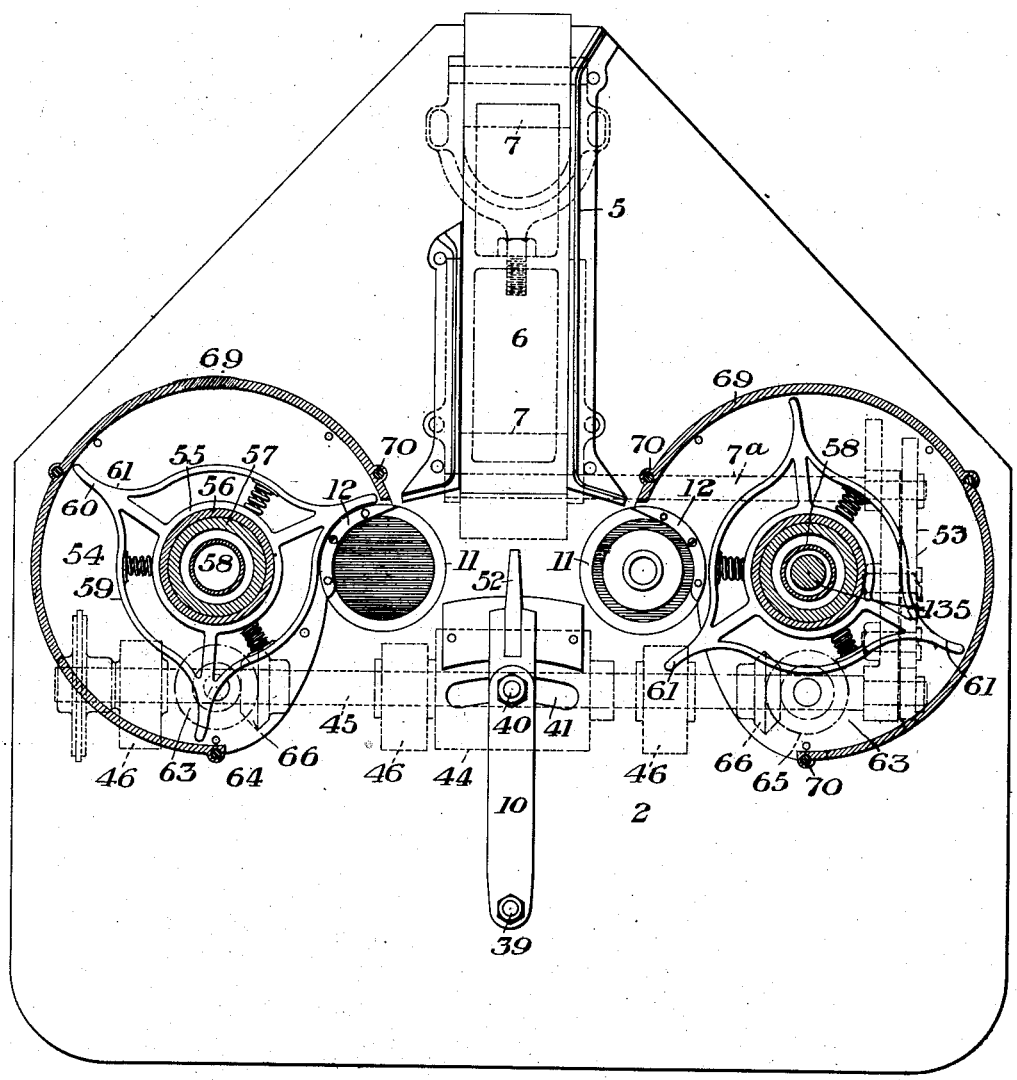

E. P. WETMORE.
BOTTLE CAPPING OR SEALING MACHINE.
APPLICATION FILED JUNE 5, 1909.
1,021,565.
Patented Mar. 26, 1912.
14 SHEETS—SHEET 10.
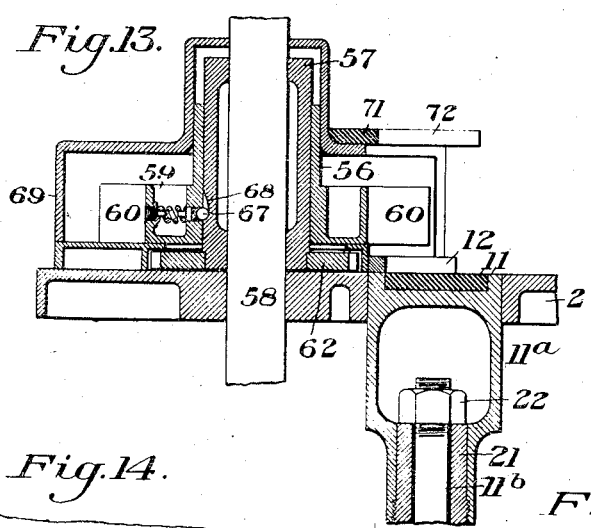
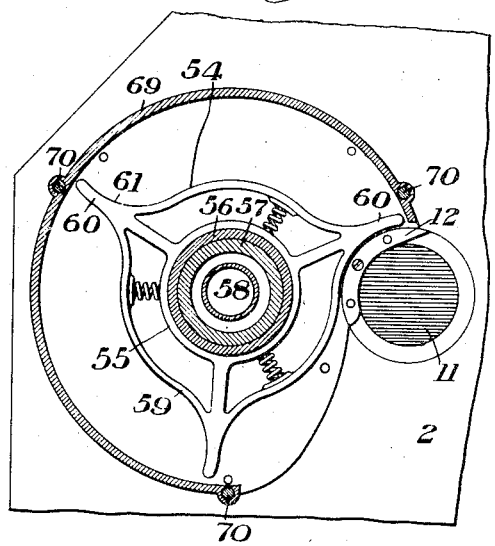
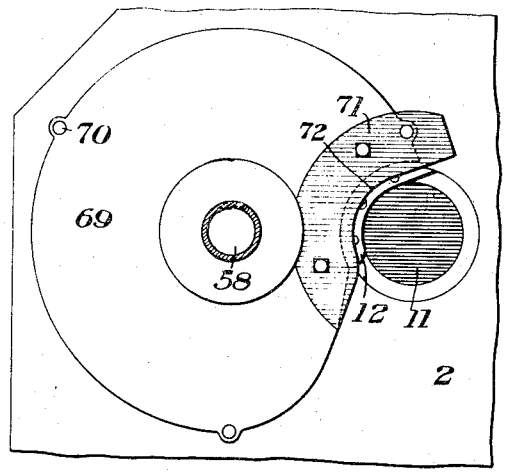
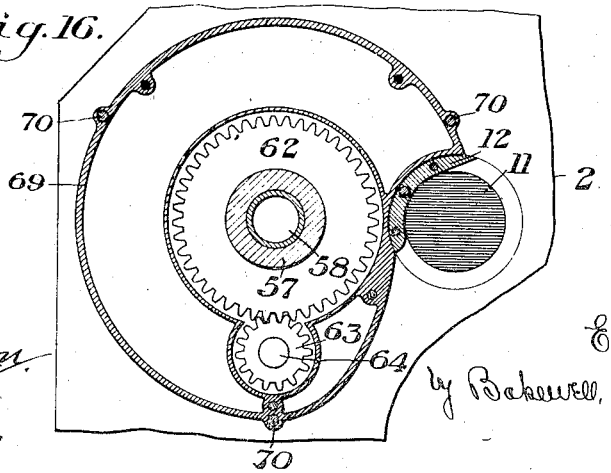
WITNESSES
R. H. Balderson.
G. L. Writer.
INVENTOR
E. P. Wetmore,
by Bakewell, Byrnes & Parmelee,
his Attys.

E. P. WETMORE.
BOTTLE CAPPING OR SEALING MACHINE.
APPLICATION FILED JUNE 5, 1909.
1,021,565.
Patented Mar. 26, 1912.
14 SHEETS—SHEET 11.
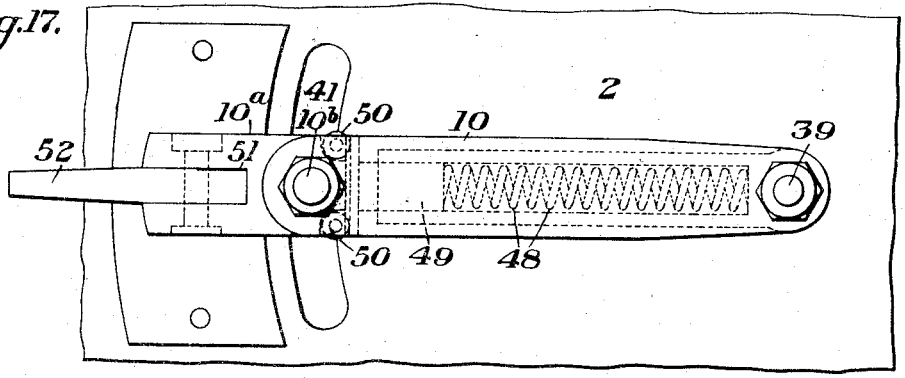
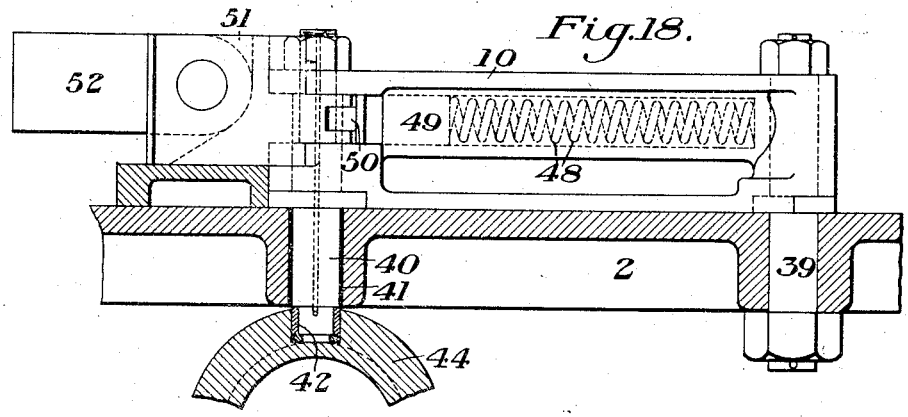
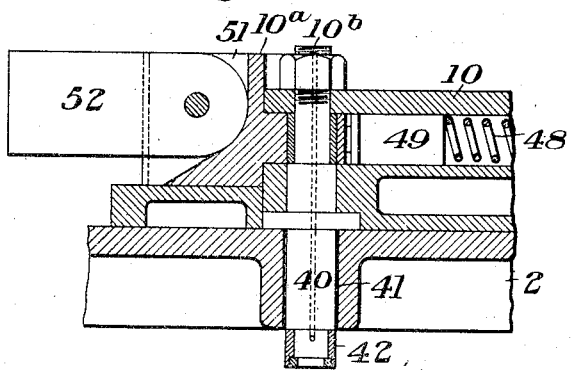
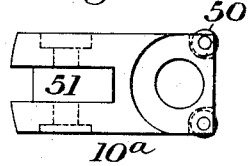
WITNESSES
R A Balderson
G L Winters
INVENTOR
E. P. Wetmore,
by Bakewell, Byrnes & Parmelee,
his Attys.

E. P. WETMORE.
BOTTLE CAPPING OR SEALING MACHINE.
APPLICATION FILED JUNE 5, 1909.
1,021,565.
Patented Mar. 26, 1912.
14 SHEETS—SHEET 12.
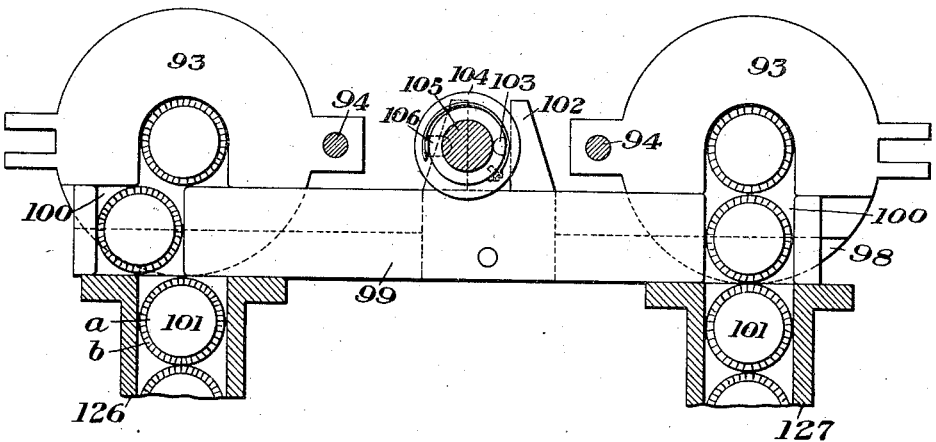
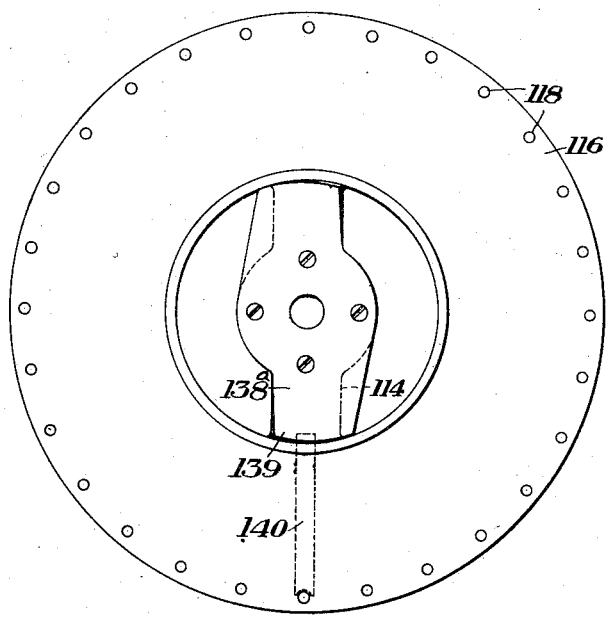
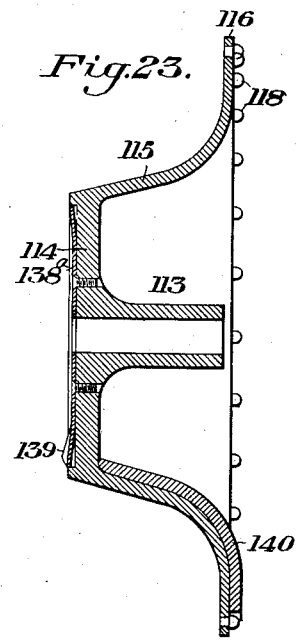
WITNESSES
R H Balderson
G L Ouriere
INVENTOR
E. P. Wetmore,
by Bakewell, Byrnes & Parmelee,
his Attys E. P. WETMORE.
BOTTLE CAPPING OR SEALING MACHINE.
APPLICATION FILED JUNE 5, 1909.

1,021,565.

Patented Mar. 26, 1912.

14 SHEETS—SHEET 13.

WITNESSES
R. H. Balderson
G. L. Winters

INVENTOR
E. P. Wetmore,
by Bakewell, Byrnes & Parmelee,
his Attys.

E. P. WETMORE.
BOTTLE CAPPING OR SEALING MACHINE.
APPLICATION FILED JUNE 5, 1909.

1,021,565.

Patented Mar. 26, 1912.

14 SHEETS—SHEET 14.

WITNESSES

INVENTOR

UNITED STATES PATENT OFFICE.

EARL PORTER WETMORE, OF TOLEDO, OHIO.

BOTTLE CAPPING OR SEALING MACHINE.

1,021,565.   Specification of Letters Patent.   Patented Mar. 26, 1912.

Application filed June 5, 1909. Serial No. 500,288.

*To all whom it may concern:*

Be it known that I, EARL P. WETMORE, of Toledo, Lucas county, Ohio, have invented a new and useful Bottle Capping or Sealing Machine, of which the following is a full, clear, and exact description, reference being had to the accompanying drawings, forming part of this specification, in which—

Figure 2:
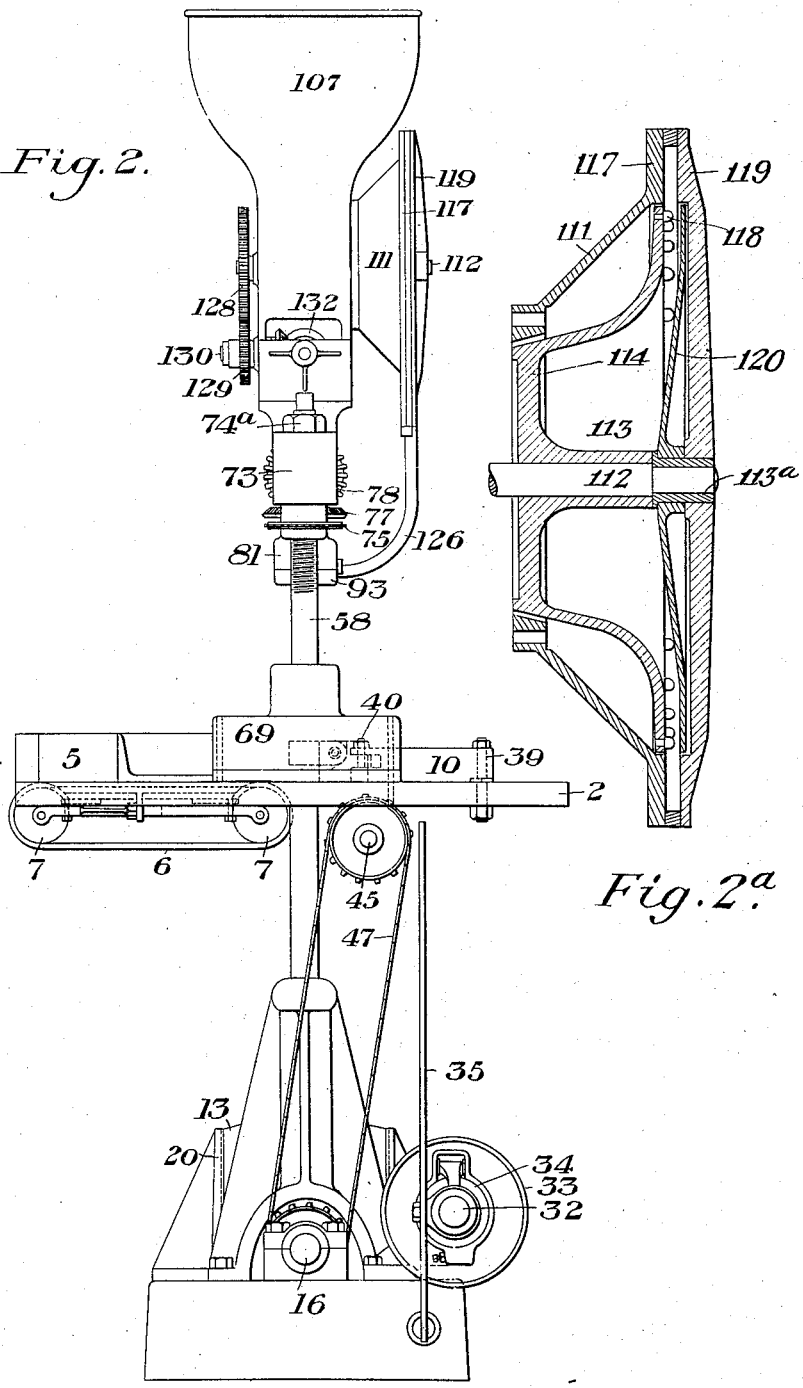
Figure 4:
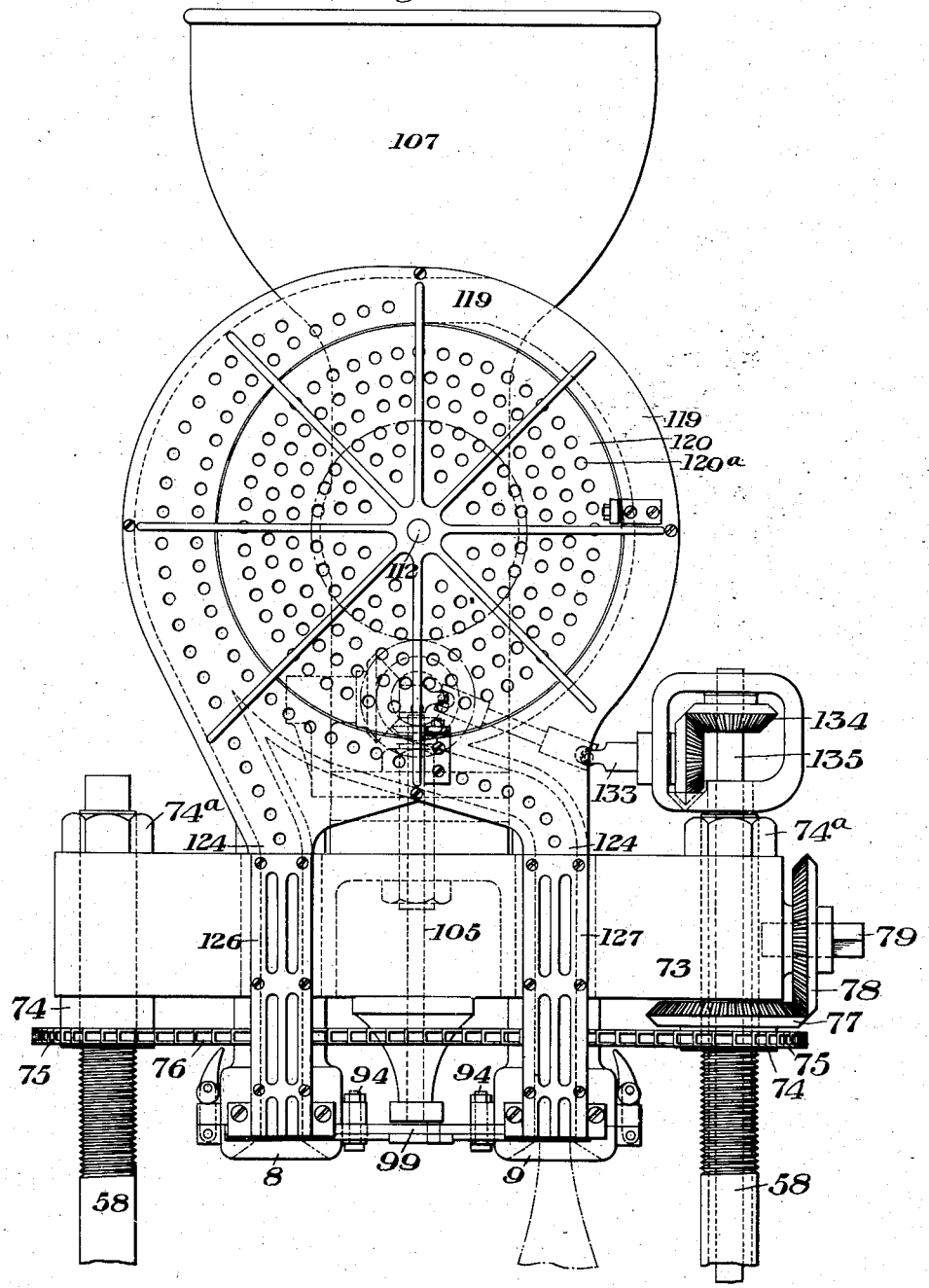
Figure 5:
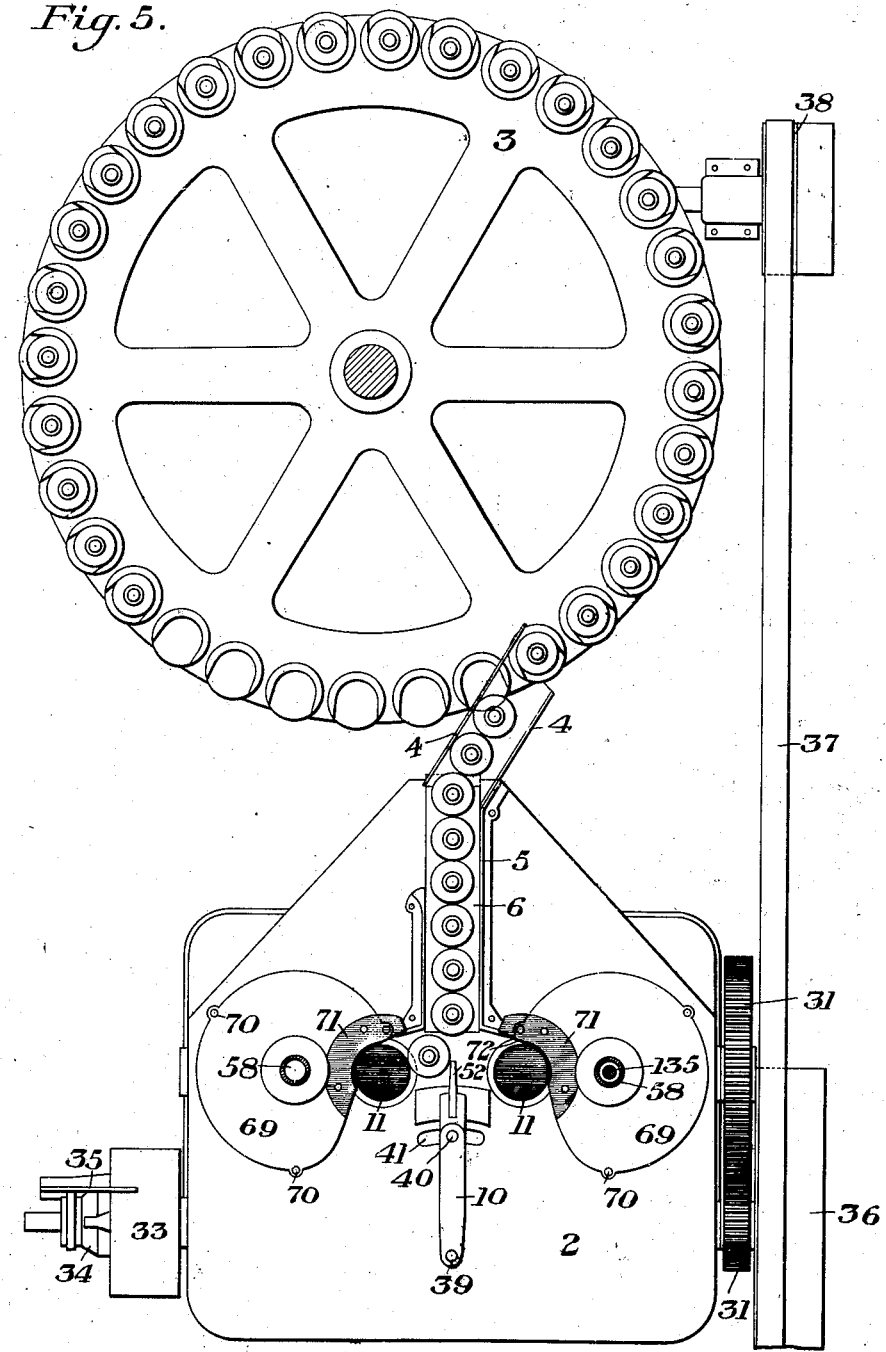
Figures 6, 7:
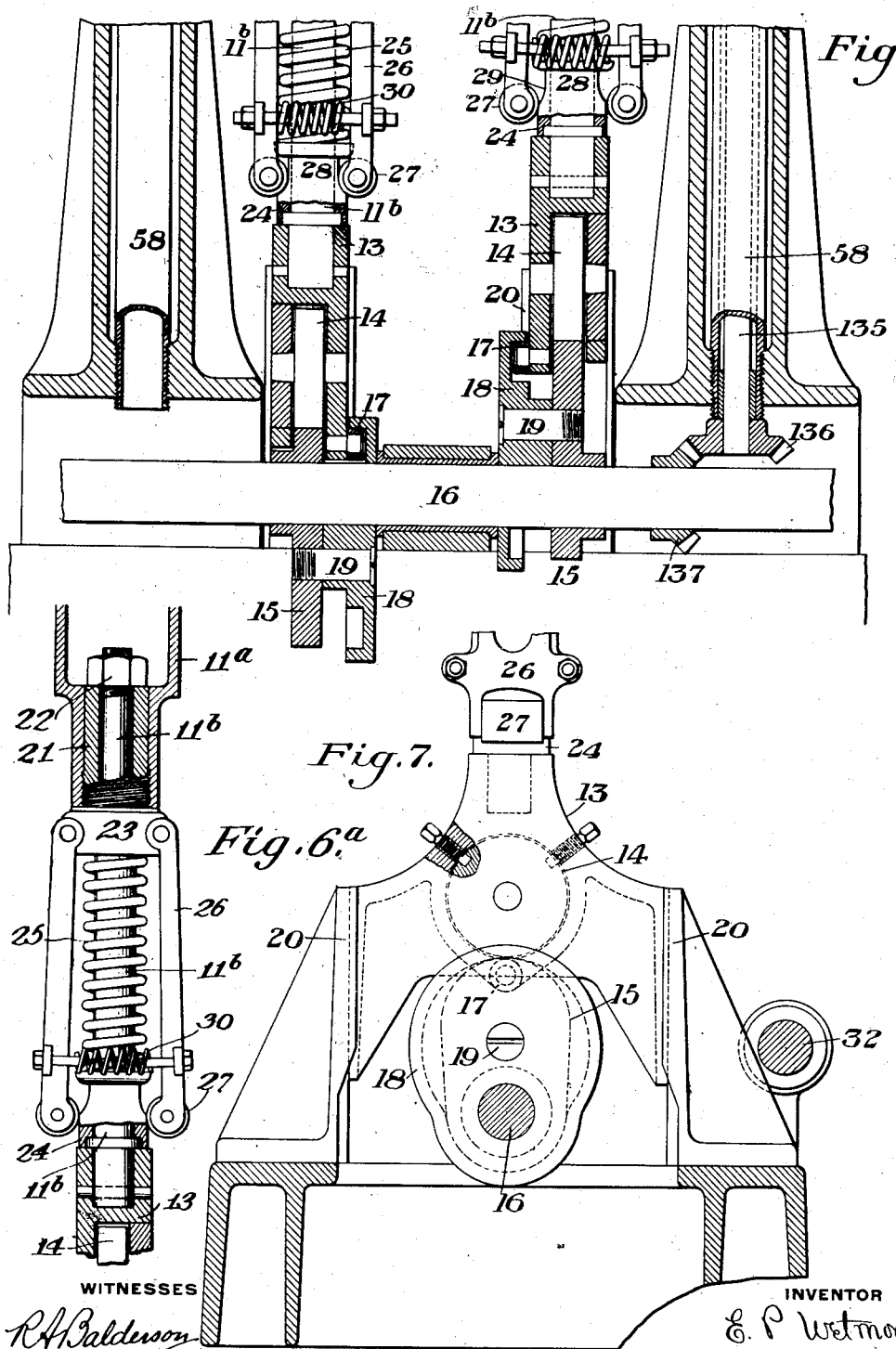
Figure 24:
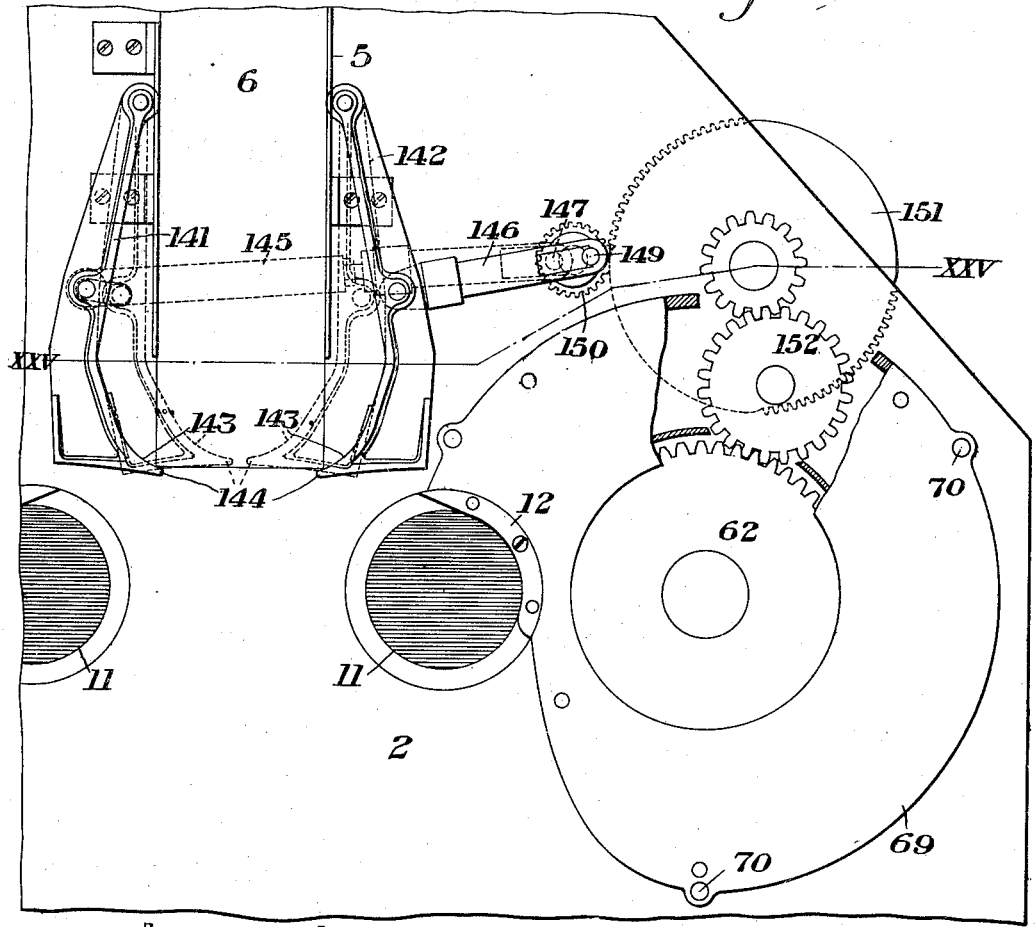
Figure 25:
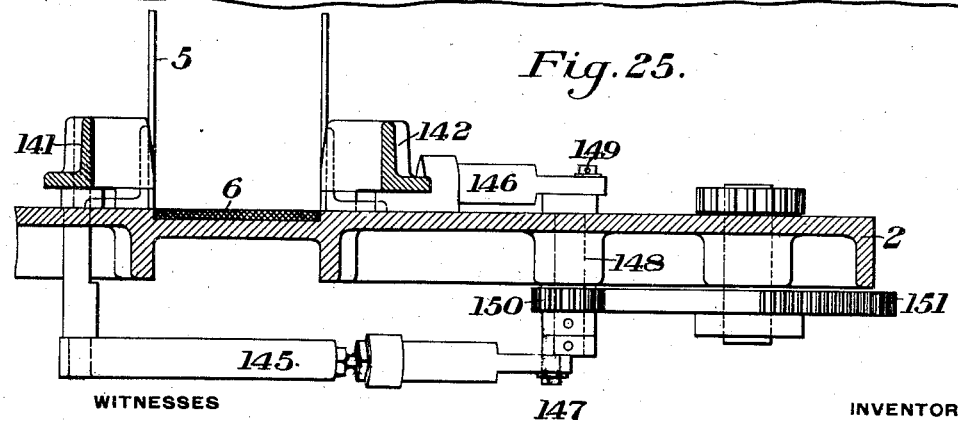
Figure 26:
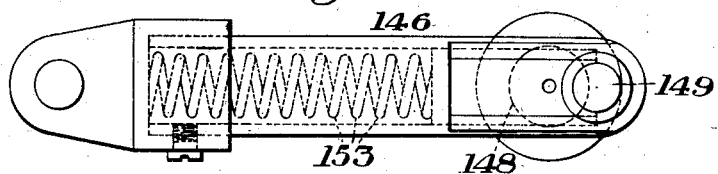
Figure 27:
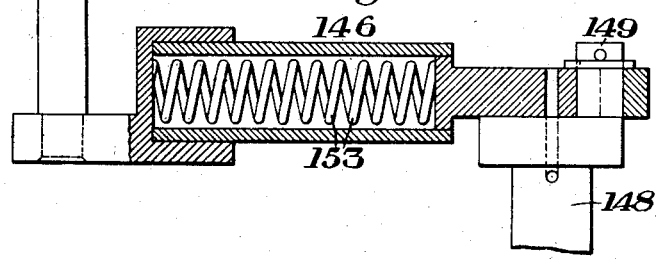
Figure 28:
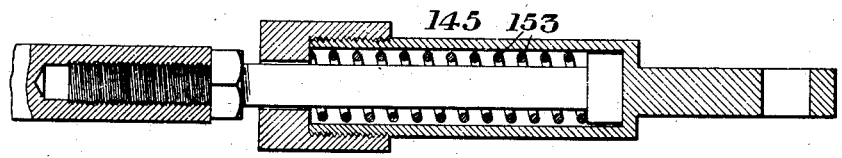
Figure 29:
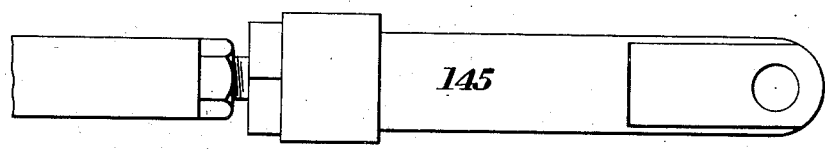

Figure 1 is a front view of the preferred form of machine embodying my invention; Fig. 2 is a side view of the same; Fig. 2$^a$ is a section through the feeder drum, showing the inclined position of the member which forms the outer closure therefor; Fig. 3 is a vertical transverse section on the line III—III of Fig. 1; Figs. 3$^a$ and 3$^b$ are detail views of a portion of the gearing for actuating the rotary drum of the feeding mechanism, said views being taken at right angles to each other; Fig. 4 is a front elevation, of the upper portion of the machine, on a larger scale; Fig. 5 is a sectional plan view showing the relation between the capping machine and the bottle filler; Fig. 6 is a detail sectional view showing the actuating means for the bottle-elevating plungers; Fig. 6$^a$ is a detail view showing the spring mechanism of one of the plungers; Fig. 7 is a sectional end elevation of the actuating means for the bottle-actuating plungers; Fig. 8 is a vertical section of one of the capping heads; Fig. 9 is a side elevation of the same; Fig. 10 is a section on the line X—X of Fig. 8; Fig. 10$^a$ is a detail view of a bottom or guide member of the sealing head; Fig. 11 is an enlarged view showing the cap-feeding mechanism; Fig. 11$^a$ is a fragmentary detail view showing the action of the cap-feeding mechanism; Fig. 12 is a sectional plan view of the machine taken on the line XII—XII of Fig. 1; Figs. 13, 14, 15 and 16 are detail views of one of the bottle removers or wipers; Figs. 17, 18, 19 and 20 are detail views of the distributing arm; Fig. 21 is a sectional view of the cap separator; Fig. 22 is an end view of the rotary member of the feeding mechanism; Fig. 23 is a sectional view of the same; Fig. 24 is a sectional plan view showing a synchronizing device for controlling the delivery of the bottles to the capping machine; Fig. 25 is a section on the line XXV—XXV; and Figs. 26, 27, 28 and 29 are detail views of yielding connections of the device shown in Figs. 24 and 25.

My invention has relation to bottle-sealing or capping machines, of that class which apply metallic caps or closures to the bottle, and secure the same thereto by bending a flange of the cap or closure into locking engagement with a shoulder of the bottle neck.

The object of my invention is, generally stated, to provide a machine of this character by means of which bottles may be rapidly sealed or capped in a proper manner, with a minimum of breakage and of manual handling of the bottle.

Other and more specific objects of the invention are as follows: to provide a machine of this character having means whereby the bottles are automatically delivered to the capping mechanism from the bottle-filling mechanism; to provide means of novel and effective character for feeding the caps or closures to the capping head; to provide a capping head of novel and effective character which will to a large extent prevent breakage of the bottles, and which will adapt itself to variations in size and irregularities of the bottle necks; to provide novel and efficient means for bringing the bottles to the action of the capping heads, and for removing the capped bottles; and to provide a machine of the character described which will be extremely simple in its general construction and mode of operation.

A further object of the preferred form of my invention is, to provide a duplex machine, having a pair of capping heads, with means for distributing the bottles as they are received from the filler alternately into position to be acted upon by one or the other of the two heads.

A further object of the preferred form of my invention is to so arrange the capping machine with reference to the filling machine, and particularly the driving mechanism for the two machines, that the bottle-filling machine will be automatically stopped when the capping machine is stopped for any purpose, while permitting the capping machine to be operated independently of the filling machine.

Other objects and advantages of the invention will hereinafter appear.

The nature of my invention will be best understood by reference to the accompanying drawings, in which I have shown the preferred form thereof, and which will now be described, it being premised, however, that various changes may be made in the details of construction and arrangement, and combination of the parts, without departing from the spirit and scope of my invention as defined in the appended claims. In these drawings I have shown my invention as applied to a machine of the duplex type, which is the preferred form, but it will be obvious from the following description that many of the features thereof are equally applicable to a simplex machine, and, therefore, except in so far as the claims are specifically limited to a duplex machine, they are not to be taken as so limited.

In the drawings, the numeral 2 designates the table of the machine upon which the bottles are delivered from the bottle filling machine. This bottle-filling machine is in general of the usual character, and forms no part of the present invention, except in so far as its novel arrangement with respect to the capping machine is concerned. As shown in Fig. 5, it consists of a rotary table 3 upon which the bottles are placed and are successively filled as the table is rotated. This rotary table is arranged adjacent to the capping machine, as shown in Fig. 5, guides 4 being provided to successively deflect and remove the bottles from the rotating table into the bottle runway 5 on the table of the capping machine. The bottles are moved between the guides 4 and into the runway 5 by the rotative movement of the table, successive bottles upon entering the guides forcing along the bottles in advance. The bottom of the runway 5 is formed by an endless conveyer 6 mounted upon the carrying wheels 7, in the manner clearly shown in Figs. 2, 3 and 12, said conveyer being positively driven in the manner hereinafter described. The bottles pass off from this conveyer onto the table 2, between and below the two sealing heads 8 and 9, and are moved alternately to a position underneath one or the other of said heads by the action of an oscillating distributer arm 10. This arm acts to move the bottles alternately to the right and left onto the vertically reciprocating plungers 11, one of which is arranged below each sealing head with its vertical axis in alinement with the vertical axis of the head, said plungers working through the table 2 and being arranged to elevate the bottles to carry their neck portions into the sealing heads. Each plunger has at its upper end a centering lip or flange 12 removably secured thereto, and which acts to center the bottle properly underneath the head. These centering lips or flanges are made removable so as to adapt the machine to different sizes of bottles, a different form of lip or flange being necessary for instance with pint bottles than is required for quart bottles. Each of the plungers 11 is composed of an upper member or section 11ª, (see Fig. 13), which telescopically engages a lower section 11ᵇ, (Fig. 6), which is carried by or secured to a cross-head 13 carrying an anti-friction roller 14 which is in engagement with a cam 15 on the plunger-actuating shaft 16. The two cams 15 are set oppositely to each other on the shaft 16, so that when one of the plungers is in its elevated position, the other plunger will be in its lowest position, each of these cams being shaped as shown in Fig. 7 so that it will be idle during approximately one-half of the time and while the other cam is acting. Each of the cross-heads 13 also carries a second and smaller anti-friction roller 17, which engages a second cam 18 on the shaft 16, the purpose of these cams 18 being to exert a positive retracting action on the plungers. The two cams are preferably rigidly connected together, by any suitable means, such as screwbolts 19 shown in Figs. 6 and 7. The cross-heads 13 are mounted to slide vertically in guide ways 20 on the base portion of the machine. The upper end of the lower member 11ᵇ shown in Fig. 13 of each plunger extends upwardly through a guide-bearing 21 screwed in the upper member 11ª, and has a nut 22 at its upper end which normally rests upon the upper surface of said bearing. Between the bottom end of bearing 21 and a sleeve 24 on the lower member 11ᵇ, is seated a coiled spring 25, having a certain initial compression. Pivoted to the lower end head or collar 23 of the guide-bearing 21 are two arms 26, having anti-friction rollers 27 at their lower ends, which normally rest on the reduced upper portion 28 of the sleeve 24, as shown at the left-hand side of Fig. 1. This reduced portion 28 is connected to the body portion of the sleeve by the curved surface 29 which is cut to the radius of the rollers 27. Each pair of arms 26 is also connected by tension springs or spring 30.

The purpose of the construction and arrangement just described is, to permit the plunger to yield to compensate for irregularities in the heights of the bottle, and thereby prevent breakage and excessive pressure on cork or packing material in the cap. It will be readily seen that when the pressure upon any bottle is sufficient to overcome the initial compression of the spring 25, the upper member 11ª of the plunger will move downwardly against the compression of said spring, causing the rollers 27 to move down the curved surfaces 29 onto the body of the sleeve 24, as shown at the right-hand side of Fig. 1, thereby forcing the pivoted arms 26 away from each other against the action of the tension spring 30. In this manner the plunger is permitted to yield sufficiently to prevent undue pressure that would be caused by a bottle of a greater height than the normal or standard.

The cam shaft 16 is shown as driven by gear connection 31 with a main driving shaft 32, journaled at the base of the machine, at one side and driven by a pulley 33 having a clutch connection 34 with said shaft, said clutch being controlled by a shifting lever 35. The shaft 32 at the opposite end of the pulley 33 carries a belt or other driving wheel 36, connected by a belt or other driving connection 37 with a tight and loose pulley 38 which actuates the rotary table 3 of the bottle-filling machine. By driving the bottle-filling machine in this manner through the capping machine, the stoppage of the capping machine for any reason will also stop the filling machine and prevent bottles being delivered from the table 3 onto the table 2. The belt or other driving connection 37 may, however, be disconnected or thrown out of gear so as to permit the capping machine to be operated independently of the filling machine.

The distributer arm 10, by means of which the bottles from the runway 5 are alternately moved onto one or the other of the plungers 11, is pivoted to the table 2 at 39, and has a bolt or stud 40 projecting through a slot 41 in the table 2 with an anti-friction roller 42 at its lower end which engages a cam groove 43 of a cam 44 mounted on a shaft 45 supported longitudinally in suitable bearings 46 underneath the table 2, as clearly shown in Figs. 1, 2, 3 and 12. The shaft 45 is shown as driven by a sprocket chain 47 from the shaft 16. The arm 10 is shown in detail in Figs. 17, 18, 19 and 20. Its free end portion 10ª is pivotally connected to the body of the arm by a vertical pin or bolt 10ᵇ, being an extension of 40, and is acted upon by the centering spring 48, which is seated in the body of the arm and bears against a shoe 49 which contacts with antifriction rollers 50 on the portion 10ª. The portion 10ª is also provided with a vertical slot 51, in which is pivotally seated a vertically movable finger 52. The pivotal section 10ª is arranged to yield against the action of the spring 48 in case of contact with an obstruction, such as an overturned bottle, while the pivoted finger 52 will readily throw upwardly by contact with the obstruction to pass over the same, after which it falls by gravity to its normal position. The cam groove 43 in the cam 44 which actuates this arm is so designed as to give the arm a slow initial and final movement in each direction, with a more rapid motion during the intermediate portion of its movement. This gives an easy contact with the bottle to be moved, preventing it from being tipped or overturned by the impact of the arm and gradually overcoming its momentum, after which it is rapidly moved toward one of the plungers 11, the final movement being again a slow one to prevent the bottle from being moved too violently against the centering lip or flange 12 on the plunger. In the machine shown, the shaft 45 is utilized as a driving means for the bottle conveyer 6, being connected to the extended shaft 7ª of one of the carrying wheels 7, of said conveyer through the spur gearing 53, as shown in Fig. 12.

54 designate the wipers by means of which the capped bottles are pushed off from the plungers 11 onto the forward portions of the table 2. One of these wipers with its driving gearing and accompanying parts, is shown in detail in Figs. 13, 14, 15 and 16. They consist each of a hub portion 56, which has a clutch connection with a sleeve or bushing 57, which is free to turn around a hollow post or column 58 which extends vertically upward through the table of the machine from the base or bed, one of these posts or columns being arranged at each end portion of the machine, as shown. The hub portion 56 of each wiper carries a spider 59 having a series (in the present instance three) of projecting arms 60 with the curved forward faces 61 for contact with the lower portions of the bottles. These arms 60, as the wipers are rotated, move over and across the upper end of the adjacent plunger 11 and thereby move the bottles off from such plunger and forwardly onto the table 2. The sleeve 57 has keyed or otherwise secured to its lower end a spur gear wheel 62, which is driven by a pinion 63 on a short vertical shaft 64 having a bevel gear wheel 65 meshing with a corresponding bevel gear wheel 66 on the shaft 45 before referred to. The clutch connection between the hub 56 and the driving sleeve 57 of each wiper is preferably formed by a plurality of spring-pressed clutch balls 67, which are arranged to engage the clutch recesses or cavities 68 in the sleeve 57, these cavities having their walls beveled both laterally and vertically. Each wiper is inclosed in a shield or guard 69, which is arranged to slide vertically on the post or column 58, and which is cut away at the side adjacent to the plunger 11, as clearly shown in Figs. 13, 14, 15 and 16. This shield or guard is not only guided in its movements by the post or column 58, but is also preferably provided with a plurality of vertical guide bolts 70 which extend through guide openings in the table 2.

71 is a guard, preferably of non-metallic character, which is secured to each of the guards 69, and which has a curved edge 72 above the plunger 11 and which coöperates with the centering lip or flange 12 to properly center the bottle underneath the seating or capping head.

While the movement of the wipers is normally so timed that the arms 60 will not come over the upper end of the plunger 11 except at the time such plunger has been lowered after a capping operation, it sometimes happens that some obstruction, such as an overturned bottle, or a piece of a broken bottle, or some tool will accidentally fall in the way of these arms to prevent their rotation, in which case one of the arms might be directly over the plunger at the time it is making its next upward movement. To prevent injury to the machine due to anything of this kind, is the purpose of the clutch device which has just been described. In case the wiper should become obstructed, the clutch balls 68 will be disengaged from the clutch recesses in the driving sleeve 57, allowing said sleeve to rotate without rotating the wiper; and if the plunger starts on its next upward movement with one of the wiper arms above the same, the entire wiper, together with the guard or shield 69 will be moved upwardly on the post or column 58 without injury to any of the parts. It will be seen from Fig. 13 that the wipers have an extended bearing on the driving sleeves 57, so that they can move freely up and down thereon without any tendency to bind or cramp. After the obstruction has been removed, the clutch will at once restore the driving connection with the sleeve 57 and the wiper will automatically time itself.

The sealing heads 8 and 9 are secured in the cross-beam 73, supported above the table 2 on the upwardly extending ends of the posts or columns 58. These upper ends are threaded, as shown in Fig. 1, and pass through the ends of the cross-beam, so that the cross-beam can be adjusted thereon to a greater or less distance from the table to suit bottles of difference heights. This adjustment may be conveniently effected by means of the adjusting nuts 74 carrying sprocket wheel 75 connected by a sprocket chain 76. One of the nuts 74 also carries a bevel gear 77 which meshes with a bevel gear 78 on a stub shaft 79 adapted for engagement with a hand wrench or lever. By rotating this shaft 79 the two nuts 74 will be run up or down to thereby secure the desired adjustment of the cross-beam, it being obvious that both nuts will be moved uniformly and thus prevent any tendency of the head to bind. Nuts 74ª hold the beam in contact with nuts 74.

One of the sealing or capping heads is shown in detail in Figs. 8, 9, 10 and 10ª. It consists of an outer tubular casing or shell 80 having an enlarged interiorly chambered portion or head 81 at its lower end in which are seated a plurality of radially movable segmental dies 82, these dies together making up a complete circle at their inner ends. Each die is pressed forwardly by a spring 83, seated in a pocket in the die and against a screw plug 84, which has a threaded bearing in a bushing or ring 85 threaded into the enlarged portion 81 of the shell or casing 80. 86 is a rod or plunger, which extends vertically upward into the shell or casing, being guided at 87 at its upper end and at 88 near its lower end, and which terminates at its lower end in a head 89. 90 is a spiral spring coiled around the rod 86 and seated at its upper end against the cap-nut 91, which carries the upper bearing 87, and at its lower end against a nut or collar 92 threaded or otherwise secured to said rod. Each head is provided with a lower guide member 93, which is pivoted to the head at 94, and is normally secured in proper relation to the head by means of a link 95 or other suitable fastening which can be readily removed to permit the member to be swung around on its pin or pivot 94. This member is provided with a central upwardly tapered guide opening 96, which leads to the cap seat 97 which is immediately below the head 89 of the plunger 86. The guide member 93 is cut away or shouldered at one side as shown at 98 to form a seat and bearing for the longitudinally reciprocating slide 99. This slide is shown in detail in Fig. 21, and is for the purpose of separating the caps as well as agitating the same, in the manner hereinafter described. It extends across the space between the two heads, one end portion being seated at 98 in one head, and the other end portion having a corresponding seat in the other head. Each end portion of the slide is provided on its upper surface with a recess 100 adapted to receive one of the bottle caps or closures 101. The intermediate portion of the slide between the two heads has a slotted lug 102, which is arranged to be engaged by a crank pin 103 of a crank wheel 104 on the lower end of a vertical shaft 105, so that as said shaft is rotated, the slide will be reciprocated longitudinally. The crank wheel 104 is preferably connected to the shaft 105 by a spring clutch 106, as shown in Fig. 21, so that in case of any obstruction to the movement of the slide said clutch will readily disconnect itself.

107 designates a feed or supply hopper for the caps or closures 101. This hopper is supported from the cross-beam 73, and has a central bottom throat or pocket 108 formed with a downwardly and forwardly inclined bottom wall 109. The throat or pocket 108 has an opening 110 in its front wall surrounded by the forwardly projecting outwardly flared hopper-shaped flange 111. Extending through the throat or pocket 108 is a shaft 112, which also extends through the hopper-shaped member 111 and has secured thereto within said member a rotary hollow feeding drum 113. This drum is shown in assembled relation in Fig. 3, and is also shown in detail in Figs. 22 and 23. It consists of a hub portion which is secured to the shaft 112 with oppositely extending spider arms 114 connecting said hub with the outer funnel-shaped wall or shell 115. The inner end of the drum coincides with the opening 110, and is entirely open except for the arms 114. The outer end of its wall or shell terminates in an outwardly flared flange 116, which is in the plane of the outer flanged edge 117 of the member 111. The flange 116 carries a plurality of spaced projecting pins 118. These pins are spaced from each other just the proper distance to permit the crown portion $a$ of the caps 101 to just pass between adjacent pins, and to prevent the corrugated flange portion $b$ of said caps to pass therethrough, as will best appear by reference to Figs. 11 and 11$^a$.

119 is an annular ring, which is placed parallel with the flange 117 and is separated therefrom by an intervening space, as shown in Fig. 3, of just about sufficient thickness to receive the caps in flatwise position. Within this ring 119 is a disk 120, which is revolubly mounted on the hub 113$^a$ on ring 119 and has a slight amount of looseness or wabble on said hub. This disk and also the flange 119 are preferably formed with a plurality of small holes or openings 120$^a$ through which the action of the feeding devices may be viewed. The flange 119 is spaced from the flange 117 by means of the ribs 121; and the plane of disk 120 is slightly inclined to the vertical with respect to the plane of the ring 119 being held in this position by any suitable means, such as the rollers 119$^a$, carried by brackets 119$^b$ secured to the ring 119 (see Fig. 1). Between the outer rib 121 and one edge of the drum 117 is a space or chamber 122, which extends downwardly and is divided at its lower portion by means of ribs 123 into two feed channels 124 and 125 which communicate respectively with the chutes 126 and 127, which lead downwardly to the heads 8 and 9, said chutes abutting the lower pivoted members 93 of the heads at one side in the manner best shown in Fig. 21. The shaft 112 carries at its opposite end a gear wheel 128, which is engaged by pinion 129 on a short shaft 130 having a bevel gear wheel 131 which meshes with a bevel gear wheel 132. This bevel gear wheel 132 is connected by a jointed shaft 133, with a bevel gear wheel 134 on a vertical shaft 135 which extends upwardly through one of the vertical posts or columns 58 and which is connected at its lower end by a bevel gear wheel 136 with a bevel gear wheel 137 on the shaft 16. The bevel gear wheel 132 also drives the bevel gear wheel 138 on the upper end of the vertical shaft 105 which actuates the slide 99. Inasmuch as by the vertical adjustment of the cross-beam 73, all parts of the machine attached to or carried by the cross-beam, including the hopper and feeding mechanism, is moved therewith, the flexible shaft 133 is provided in order to form a driving connection for the feeder and for the slide 99 in the various adjustments of said beam.

The caps or closures 101 are placed in the hopper 107 in bulk and without regard to their position. These caps feed down into the throat or pocket 108, the inclined bottom wall 109 serving to throw them forwardly toward the rotary drum 113 into which they enter past the arms 114. The caps are prevented from catching or forming an obstruction at the entrance to the drum 113 by means of the agitators 138$^a$, which are secured to the arms 114, and which, as the drum 113 rotates, constantly stir up the caps at this point, said agitators having the flared agitating edges 139 (Figs. 22 and 23). The caps in the drum 113 work down into the space between the flange 117 and the ring 119, and are caught between the pins 118 in the manner shown in Fig. 11. The caps which are in the proper position for use, will readily pass between said pins, while those that are the wrong-side-to will be prevented from passing owing to the fact that, as before stated, the distance between adjacent pins 118 is less than the diameter of the corrugated flange $b$ of the caps. In starting the machine, those caps which are in the correct position will at one pass through between the pins and to the lower portion of the chamber 122, as shown in Fig. 11, and thence into the feed chutes 126 and 127, as also clearly shown in the said figure. When these chutes become filled, the caps will continue to accumulate in the lower portion of the chamber 122, the caps already in such portion of the chamber preventing further caps from passing therein at the lower portion of the drum 113. Consequently, the caps are carried by the pins farther up the side of the drum and escape between the pins into the upper portion of the space 122. If the space becomes filled, somewhat above the horizontal line the excess caps will fall back into drum 113 between the pins. Those caps which, by the selective action of the pins 118, are in the wrong position and cannot enter the space or chamber 122, will be carried up to the upper portion of the drum and will thence drop into the lower portion thereof, this operation being repeated until eventually they are in proper position to pass the pins. These pins, as shown, are of relatively small diameter, so as to have a minimum amount of surface contact with the caps so as to obviate and tendency of the caps to become wedged or jammed between the pins. In the event that a cap should become wedged between the flange of the drum and the adjacent face of the disk 120, said disk will be rotated by the friction of the cap thereon and the cap will be carried to the upper portion of the drum where the space between said disk and said flange is slightly greater than the corresponding space at the lower portion of the drum, thereby permitting the cap to free itself. I also preferably provide the drum 113 with the agitator 140, which at each revolution of the drum, stirs up the caps in the lower portion thereof and keeps them in a loose and freely moving condition at the point where they pass into the space between the flange 117 and the ring 119. The caps pass down the feed chutes 126 and 127, and are brought successively to the heads 8 and 9 in the manner best shown in Fig. 21. As fast as one cap is used, the weight of the column of caps in the chute immediately forces the lowermost caps forwardly, the cap which has previously been at the lower end of the chute passing into the recess 100 in one end of the slide 99, and the cap which has previously been in said recess being advanced into the receiving space of the head immediately below the plunger 86. While the cap in one of the heads is being applied to a bottle by the action of the radial dies, the next adjacent cap has been separated therefrom by the action of the slide 99, as shown at the left-hand side of Fig. 21, this separating action being desirable by reason of the tendency of the corrugated flanges of the adjacent caps to engage each other and cause them to hang together. By moving the cap in the manner described, the cap in the slide is entirely separated from the adjacent caps. As soon as a cap has been applied, the slide reverses its movement, thereby effecting a separation of the caps at the other head and permitting the new cap to come into the slide of the first-named head and the cap already in said slide to pass into the head. The cap receiving recesses or seats in the end portions of the slide form in effect portions of the feed chutes which are temporarily moved out of the line of feed to obstruct the flow of caps to the heads while the sealing operations are being performed. The arrangement is, in function, the equivalent of moving the lower ends of the feed chutes out of the line of feed, but is, mechanically, a much more simple and practical expedient. This slide also has another function, which is as follows:—The caps generally lap by one another an amount equal to the radial length of a corrugated flange, and when the slide moves so that its recess is out of line with the chute the edge of the recess engages the adjacent cap which is in the chute and pushes it back a short distance in the chute. This causes a movement of the entire column of caps within the chute and extending up into the space or chamber 122. This slight movement occurring in each chute after a cap has been applied to a bottle, keeps the caps in the chute and in the chamber 122 in a free condition so that they readily feed down by gravity. When a cap has thus been placed in each sealing head, the movements of the machine are so timed that a bottle has been placed upon the corresponding plunger 11, said plunger is elevated to raise the bottle to bring its neck within the guide opening 96 underneath the cap, the upward movement of the bottle forcing its mouth into the cap and the cap and bottle moving upwardly against the head 89 of the spring-pressed plunger 86. As the cap is carried upwardly on the bottle within the radial dies 82, these latter act to bend the flange $b$ of the cap downwardly into locking engagement with the usual shoulder in the neck of the bottle.

By making the dies in a plurality of independently yielding radial segments, they are able to yield independently to irregularities in the mouth of the bottle, and are able to adapt themselves to considerable variations in the size and form of the bottle mouths. This is of great advantage, since it very greatly reduces the breakage which occurs with rigid dies, which are unable to yield in this manner to irregularities in size and shape of different bottles. By means of these segmental dies, I am enabled to make a perfect application of the caps to the bottles with practically no breakage and with a very small percentage, as compared with all previously known methods, of what is known as "leakers," these "leakers" are usually caused by imperfect application of the cap in the sealing operations. It will be noted that the lower corners of the dies are rounded, for a double purpose; first, to center the crown of the cap within the dies; and second, to cause the lower face of the dies to first engage the outer portion of the corrugated flange of the cap and continue this engagement until the flange has been practically forced to its locking position. This manner of forming the dies prevents any tendency to cut or shear the corrugated flange from the skirt of the cap, and also in the bending action, causes the bending line at the inner ends of the corrugations to be forced inwardly against the bottle neck to act as a fulcrum for the bending operation.

The operation of the several parts of the machine have been described in detail in connection with the foregoing description, but a brief résumé of the general operation may be given as follows:—The filled bottles are automatically delivered from the filling machine into the runway 5, being moved forward onto the conveyer belt 6. This conveyer moves the bottles forwardly to a point adjacent to and between the two plungers 11; and by the movement of the distributer arm 10, succeeding bottles are alternately moved to the right or left onto one or the other of the said plungers. The movements of the machine are so timed that each plunger will be in its retracted position at the time the distributer arm acts to move a bottle thereon. The plunger upon which the bottle has been placed is then raised by the action of its elevating cam, carrying the bottle upwardly to bring its neck portion within the sealing or capping head to receive and apply thereto a cap in the manner before described. The plunger is then retracted by gravity and its retracting cam, and when its upper end reaches the level of the surface of the table 2 the bottle is pushed off and forwardly onto said table by means of one of the wipers. While one plunger is moving upwardly with a bottle, the other plunger is at rest, its bottle is being removed, and another bottle is placed thereon. The capped bottles are removed from the front portion of the table 2 by hand.

In some cases it may be desirable to provide the bottle-timing device, such as I have illustrated in Figs. 24 to 29, inclusive. This device, as shown, consists of a pair of pivotal arms 141 and 142, said arms being pivoted at opposite sides of the discharge end of the bottle runway 5. These arms have inwardly curved inner vertical faces 143, and terminate at their free ends in the toe portions 144. These arms are arranged to be oscillated in timed relation to the movement of the distributer arm 10, by means of the connections 145 and 146, the connection 145 being attached at one end to the arm 141 and at the opposite end to a wrist pin 147 on the lower end portion of an actuating shaft 148. The connection on 146 is attached at one end to the arm 142 and at the other end to a wrist pin 149 on the upper end of the shaft 148. The shaft 148 carries a mutilated pinion 150, which is arranged to be driven by a mutilated gear wheel 151. This gear wheel 151 is in turn driven by the gear connections 152 with the driving gear wheel 62 of one of the wipers. Each of the connections 145 and 146 has two telescoping sections, as shown in Figs. 26 to 29, inclusive, with an interposed spring 153. The gearing for the device is so timed that the arms 141 and 142 will make one complete oscillation for each bottle delivered. It sometimes happens that there will be an irregularity in the delivery of the bottles to the runway 5, due to the fact that the operator may sometimes miss placing a bottle on the filler when he should do so. In such cases a break occurs in the row of bottles passing through the runway 5, and it is possible for a bottle to assume such a position at the delivery end of the runway that it will not be properly engaged by the distributer arm 10. This is entirely overcome by the use of the timing device, since the arms 141 and 142 will engage any such bottle, and push it to proper central position at the end of the runway for engagement with the distributing arm. In case a bottle should happen to be in such position as to be caught between the toes 144 of these arms, the springs 153 will cause the connections 145 and 146 to yield sufficiently to prevent breakage to the bottle. The inner curved faces 143 of the pivoted arms are also made of sufficient vertical height, as shown in Fig. 25, to act as guides for the bottle, to hold them in upright position and prevent any tendency to fall over. They will also act to straighten up any bottle which may have become partially tipped over in passing through the runway 5.

It will be noted that the carrier intermediate the bottle filler and the capping machine receives the filled bottles as they are delivered from the carrier and carries them freely up to a timing point or station on the capping machine adjacent to the delivery end of the conveyer. That is to say, the bottles are freely delivered to this timing point without any spacing or timing thereof except that which results from their delivery by the filling machine. At this timing point, they are engaged by the devices described, and their delivery beyond this point is accurately timed with respect to the operations of the distributing device and the further operations of the machine. In this manner, I overcome irregularities in the delivery from the filling machine and avoid the necessity for operating the filling machine and carrier in positive time relation. I am also able to move the conveyer continuously and to dispense with all stopping and starting, or intermittent movement of the filled bottles until they reach the turning point. This intermittent movement of filled bottles is objectionable in that the agitation caused thereby causes the escape of the gases from the contained liquid. Furthermore, I can deliver the bottles to the capping mechanism in the least possible time after they are filled.

By the duplex arrangement of the machine, I am enabled to double its capacity, without increasing the speed of the various operations, and thus give the machine a very large output without undue wear and tear and without such a rapid handling of the bottles as to endanger their safety.

While I have shown the bottles as fed automatically to the capping machine from the filling machine, it will be readily understood that they may be fed to the capping machine in various other ways. I prefer, however, to use this automatic delivery wherever possible, since it largely reduces the amount of labor required in handling the bottles and the breakage due to careless manual handling.

The entire machine is simple in its construction and mode of operation, the various parts are readily accessible for renewal or repairs; and the machine can be built at a much lower cost than has heretofore been possible in machines of this class.

It will be obvious that many changes can be made in the details of construction and arrangement of the various parts without departing from the spirit and scope of my invention. Thus, as before, stated, many of the features of the machine are capable of use without material change in a simplex machine; the arrangement of driving gearing may be widely changed; and various other changes made in the mechanical details of construction and arrangement.

While I have described and illustrated my invention as especially adapted for handling and capping bottles, it will be understood that my invention is not limited to bottles strictly, but that it is adapted for use with other vessels, such as jars and the like, to which a metallic seal of the general character referred to herein can be applied; and I desire the term "bottles" as used in the specification, to be thus broadly construed. It will also be understood that while I have described the rotary table shown in Fig. 5 as being the table of a bottle-filling machine, I may use instead any other suitable form of carrier or transfer device arranged to receive and deliver bottles in spaced relation to each other.

I claim:

1. A bottle capping apparatus, having a plurality of capping heads, means for automatically distributing alternate bottles to one or the other of the capping heads, means for delivering bottles successively to the distributing means, and means for deflecting bottles from a filling machine to the delivering means, and means for driving the filling machine from the capping machine; substantially as described.

2. The combination of a bottle capping machine, having two capping heads, a conveyer, means for deflecting the bottles from a filling machine driven synchronously with the capping machine to the conveyer, and means for moving the successive bottles delivered by the conveyer to one or the other of the capping heads; substantially as described.

3. The combination of a bottle capping machine, having a receiving table and a plurality of capping heads, of a distributing arm for moving alternate bottles from the distributing point on the receiving table to one or the other of the capping heads, a continuously moving carrier for carrying successive bottles to the distributing point on said table, and a runway for deflecting bottles from a bottle filling machine to the carrier, and means for driving the bottle filling machine synchronously with the capping machine; substantially as described.

4. A bottle capping apparatus comprising a capping machine having a plurality of capping heads, a runway for automatically deflecting filled bottles from a bottle filling machine and delivering them to a carrier on the capping machine, a continuously moving carrier for delivering successive filled bottles to a distributing point at the end of said carrier, and a distributing arm for moving the filled bottles from the distributing point alternately to one or the other of the capping heads, and means for driving the filling machine from the capping machine; substantially as described.

5. A bottle-capping apparatus, comprising a capping machine having two capping heads, a carrier for automatically delivering filled bottles to the capping machine, said carrier extending from the delivery point of a bottle filling machine and arranged to deliver bottles freely to a timing point or station, means for distributing alternate bottles so delivered to one or the other of said heads, and timing means engaging the bottles on said carrier at said station and timing their delivery with respect to the action of the distributing means; substantially as described.

6. A bottle capping machine having a receiving table, two capping heads, a device for distributing bottles to the two heads, a carrier for mechanically delivering filled bottles to the receiving table, and a timing device for timing the delivery of the bottles to the table, said timing device engaging the bottles to hold them, or to either move them backward or forward; substantially as described.

7. A bottle capping machine having two capping heads, a carrier arranged to receive the bottles and to deliver them freely to a timing station, means operating at said timing station to time the delivery of the bottles from said carrier, and a distributing device for then moving the bottles into a position to be acted upon by one or the other of said heads, said distributing and timing devices acting in timed relation to each other; substantially as described.

8. A bottle-capping machine having two capping heads, a continuously moving conveyer for delivering the bottles freely to a timing station, bottle-elevating means for elevating the bottles to the action of the capping heads, and a distributing device for placing bottles upon one or the other of the elevating devices, the movements of the distributing device being timed with respect to the operations of the bottle elevating means, and timing devices arranged to operate upon the bottles at the delivery end of the conveyer to time their delivery with respect to the movements of the distributing device, substantially as described.

9. A bottle capping machine having two capping heads, means for elevating the bottles to the action of said heads, and an oscillating distributer arm for moving the filled bottles in an upright position to the bottle elevating means; substantially as described.

10. A bottle capping machine having two capping heads, means for elevating the bottles to the action of said heads, and an oscillating distributer arm for moving the bottles to the bottle elevating means, said arm having a yieldable end portion; substantially as described.

11. A bottle capping machine having two capping heads, means for elevating the bottles to the action of said heads, and an oscillating distributer arm for moving the bottles to the bottle elevating means, said arm having a laterally and vertically yieldable end portion; substantially as described.

12. A bottle capping machine having two capping heads, means for elevating the bottles to the action of said heads, and an oscillating distributer arm for moving the bottles to the bottle elevating means, said arm having a laterally yieldable end portion provided with a vertically movable finger; substantially as described.

13. A bottle capping machine having two capping heads, means for elevating the bottles to the action of said heads, and an oscillating distributer arm for moving the bottles to the bottle elevating means, together with means for imparting a different speed to said arm during different portions of its movements; substantially as described.

14. In a bottle capping machine, a pivoted distributer arm, and means for giving said arm a relatively slow initial movement; substantially as described.

15. In a bottle capping machine, a pivoted distributer arm, and means for giving said arm a relatively slow final movement; substantially as described.

16. In a bottle-handling apparatus, a rotary bottle carrier arranged to receive and deliver bottles in spaced relation to each other, a continuously moving conveyer arranged to deliver the bottles freely to a timing station, means for automatically transferring the bottles from the carrier to the conveyer, a capping machine having capping mechanism and to which the bottles are automatically delivered by the conveyer, and means for timing the delivery of the bottles from the timing station of the conveyer to the capping machine, substantially as described.

17. In a bottle capping machine, a bottle elevating plunger having two telescoping sections, a spring normally holding the sections extended, and a supplemental tension device connected to one of said sections and arranged to engage the other section to be brought into operation, after a predetermined load on the plunger, said supplemental tension device comprising arms pivoted to one of the sections and having a cam bearing on the other section, and a tension spring between and connected to the said arms; substantially as described.

18. In a bottle capping machine, a bottle elevating plunger formed in two telescoping sections, a spring acting to hold said sections extended, arms pivoted to one of said sections and having a cam bearing on the other section, and a tension device connecting said arms; substantially as described.

19. In a bottle capping machine, two stationary capping heads, two bottle elevating plungers below the heads, means for alternately placing bottles on the two heads, actuating means for alternately actuating the two plungers to lift the bottles, and a single cap-feeding hopper or reservoir having a branched feeding channel, with one branch leading to each of said heads; substantially as described.

20. In a bottle capping machine, a capping head, a vertically reciprocating member for raising the bottles to the action of the head, means for mechanically moving the bottles onto the said member, said means operating in timed relation to the said member, and a continuously moving rotary wiper for removing the capped bottles from the elevating plunger, said wiper having a yielding connection with its driving member whereby it may move independently thereof in case of obstruction; substantially as described.

21. In a bottle capping machine, a capping head, a bottle elevating plunger below said head, a rotary wiper for removing the capped bottles from the plunger, driving gearing for the wiper, and a releasable clutch connection between the wiper and its driving gearing; substantially as described.

22. In bottle capping machine, the combination of a bottle elevating plunger, of a rotating device adjacent to said plunger for removing the bottles therefrom, gearing for operating the device in timed relation to the operation of the plunger, and means for permitting the device to move vertically with the plunger should the parts get out of time; substantially as described.

23. In a bottle capping machine, the combination of a bottle elevating plunger, of a rotating device adjacent to said plunger for removing the bottles therefrom, gearing for operating the device in timed relation to the operation of the plunger, and means for permitting the device to move vertically with the plunger should the parts get out of time, said device being arranged to return to its normal position by gravity; substantially as described.

24. In a bottle capping machine, the combination of a bottle elevating plunger, of a rotary wiper adjacent to said plunger and having a plurality of projecting arms, a driving means for the wiper, and a clutch connection between the wiper and the driving means arranged to permit the wiper to become disconnected from the driving member in both a rotary and a vertical direction; substantially as described.

25. In a bottle capping machine, a capping head, a bottle elevating plunger below the head, and a positively actuated continuously rotating wiper for removing the bottles from the plunger after capping, said wiper being movable vertically with respect to its driving mechanism whereby it can yield in a vertical direction when engaged by a bottle being elevated if the wiper is not in proper relation with respect to the bottle; substantially as described.

26. In a bottle capping machine, the combination with a bottle elevating plunger, of a rotary device adjacent to said plunger for removing the capped bottles therefrom, means whereby the said device may move vertically with the plunger, and a vertically movable guard for said device; substantially as described.

27. In a bottle capping machine, a bottle elevating plunger, a rotary bottle removing device adjacent to said plunger, a driving member for said device, a releasable clutch for the driving member, and a guard for the said device, and guides for said guard to permit it to move vertically with the said device; substantially as described.

28. In a bottle-capping machine, a capping head, a feeding chute or passage leading to said head, the head being stationary with respect to the chute, said chute or passage having a movable portion adjacent to the head, and means for actuating said portion to temporarily move it sufficiently past the line of feed to separate the cap therein from the cap in the head and to obstruct the flow of caps to the head; substantially as described.

29. In a bottle capping machine, a capping head, and a feeding passage or chute leading to said head, the head being stationary with respect to the chute, and means for moving the cap in the lower portion of the chute temporarily out of the line of feed a sufficient distance to separate it from the cap in the head and obstruct the flow of caps to the head; substantially as described.

30. In a bottle-capping machine, a capping head having capping dies therein, a feed chute or passage leading to said head, said head being stationary with respect to the chute, and a movable member at the lower portion of said chute or passage, said member being movable across the line of feed through the chute or passage to temporarily move the cap in the member sufficiently away from the cap in the head to prevent interference between the flanges of said caps and to obstruct the passage of caps to the head; substantially as described.

31. In a bottle-capping machine, two capping heads arranged side by side, a feed chute leading to each head, and a cap-separating member common to both heads, with means for reciprocating said member to alternately move caps therein sufficiently out of the line of feed of the caps in the chute to separate the flanges of such caps from the flanges of the caps in the respective heads, and then return them into position to enter the head; substantially as described.

32. In a bottle-capping machine, two capping heads arranged side by side, a branched feed chute having a branch leading to each of said heads, a separating slide common to both chutes and heads and having two cap seats, and means for reciprocating said slide to alternately move the caps in said seats sufficiently out of the line of feed of the caps in the branches of the chutes to separate the flanges of such caps from the flanges of the caps in the respective heads, and then return them into position to enter the head; substantially as described.

33. In a bottle-capping machine, two capping heads arranged side by side, a branched feed chute having a branch leading to each head, and a cap-separating member common to both heads and movable therein, said member being movable to temporarily move the caps therein alternately into and out of the line of feed of the caps, together with actuating connections for said member having means for rendering the member inoperative in case of obstruction; substantially as described.

34. In a bottle-capping machine, a stationary capping head, a cap feed chute leading thereto, and means for moving a cap in the chute adjacent to the one in the head out of the line of feed of the caps prior to each capping operation, to prevent overlapping of the flanges of the two caps and for subsequently returning the moved cap into position to enter the head; substantially as described.

35. In a bottle capping machine, a table onto which the bottles to be capped are delivered, a cross-beam supported above the table, a pair of capping heads mounted in the cross-beam, two bottle elevating plungers, a single shaft having two cams set to alternately elevate the plungers, and two pull down cams for the plungers also mounted on said shaft together with a single cap-feeding reservoir mounted on the cross-head and a feed chute having a branch leading to each head; substantially as described.

36. In a bottle capping machine, a vertically adjustable cross beam, a pair of capping heads carried by said beam, two bottle elevating plungers, a single shaft located in the vertical plane of the beam and having two cams thereon set to alternately elevate the respective plungers, a feed hopper also supported by said cross-beam, a branched feed chute leading from the hopper to the respective heads, together with means for temporarily moving the caps in the lower portion of the chute branches out of and then back into the line of feed; substantially as described.

37. In a bottle capping machine, a vertically adjustable support, a bottle capping device carried by said support, a cap feeding device also carried by the support, gearing for actuating said device, said gearing having a flexible element adapted to adjust itself to different positions of the support; substantially as described.

38. In a bottle capping machine, a feed hopper having an outlet opening at one side, a rotary drum having an open end arranged to register with said opening, said drum having a vertical flange provided with a plurality of spaced projections, and an independently rotatable friction member forming the closure for the open end of the drum, a space or chamber adjacent to said flange, and a feed chute communicating with the lower portion of the space or chamber, a capping head to which the feed chute leads, and means at the lower end of the chute for separating the cap in the head from the adjacent cap in the chute; substantially as described.

39. In a bottle capping machine, a hopper for the caps, a rotary drum communicating with the hopper and having a flange at its outer end, said flange carrying a plurality of spaced projections, a rotatable friction member adjacent said projections and forming the end closure for the drum, a space or chamber adjacent to said flange, and a feed chute communicating with the lower portion of the said space or chamber; substantially as described.

40. In a bottle capping machine, a hopper for the caps, a rotary drum communicating with the hopper and having a flange at its outer end, said flange carrying a plurality of spaced projections, a rotatable friction member adjacent said projections and forming the end closure for the drum, a space or chamber adjacent to said flange, and a feed chute communicating with the lower portion of the said space or chamber, together with an escape opening leading from the upper portion of the space or chamber; substantially as described.

41. In a bottle capping machine, a rotary cap-feeding member having a plurality of channels or passages for the caps formed by projecting cylindrical pins or studs of relatively small diameters having convex ends and spaced at definite distances; substantially as described.

42. In a bottle capping machine, feeding mechanism comprising a hopper, a hollow rotary drum communicating at one end with the hopper, a feed chute communicating with the drum, selecting means on the drum, and a rotatable friction member adjacent to the selecting means and forming the closure for said drum; substantially as described.

43. In a bottle capping machine, a rotary cap-feeding drum having a flange provided with a plurality of cap channels or passages, and a loosely mounted disk or plate in inclined relation to said flange and adjacent thereto and forming the end closure for said drum; substantially as described.

44. In a bottle capping machine, a feed hopper, a rotary feed drum communicating with the hopper and having a flange at its outer end provided with cap channels or passages, a shaft extending through the drum and to which it is secured, and a disk or plate loosely mounted on an outside bearing for said shaft and in inclined relation to said flange, together with means for rotating said shaft; substantially as described.

45. In a bottle capping machine, a feed hopper having a pocket or throat at its bottom formed with an opening at one side, an outwardly flared hopper member surrounding said opening and having a flange at its outer end, a hollow rotary feeding drum communicating with the said opening and having an outwardly flared outer end portion turning within the flange of the hopper member, a plurality of spaced pins or projections on the outwardly flared end of the feeding drum, a ring spaced from and parallel with the flange of the hopper member, and a loosely mounted plate or disk arranged within the said ring and opposite the end of the feeding drum, said ring and plate forming the outer end closure to said drum; substantially as described.

46. In a bottle capping machine, a feed hopper, a cap-selecting device communicating with the said hopper and having a plurality of channels or passages for the caps, a space or chamber into which said passages are arranged to discharge and having a storage capacity for at least two rows of caps, a pair of capping heads, and a branched feed chute leading from said space or chamber to the said heads, each branch of said chute being arranged to receive caps from one of the rows of caps; substantially as described.

47. In a bottle capping machine, a feed hopper, a cap-selecting device communicating with the said hopper and having a plurality of channels or passages for the caps, a space or chamber into which said passages are arranged to discharge and having a storage capacity for at least two rows of caps, a pair of capping heads, and a branched feed chute leading from said space or chamber to the said heads, each branch of said chute being arranged to receive caps from one of the rows of caps, together with means at the lower ends of said chutes for isolating the caps in the sealing heads from the adjacent caps; substantially as described.

48. In a bottle capping machine, a feed hopper having a throat or pocket at its bottom, said throat or pocket having an inclined bottom wall, a rotary feeding drum communicating with said throat or pocket at one end, and agitating means carried by the drum and arranged to prevent accumulation of caps at the point of communication between the throat or pocket and the drum and a plate or disk mounted in non-parallel relation to the end of the drum and forming its outer closure; substantially as described.

49. A bottle capping machine having two capping heads, means for mechanically feeding loose caps into said heads, a distributing device arranged to engage filled bottles ones after another and move them in upright position one into line with one head and the next into line with the other head, and a bottle timing device for insuring the proper action of the distributing device; substantially as described.

50. A bottle capping machine having two capping heads, a runway for delivering the bottles successively to the capping machine, a distributing device for moving alternate bottles into position to be acted upon by one or the other of the capping heads, and a bottle timing device at the delivery end of the runway and engaging the bottles to hold them or to move them backwardly, or force them ahead, to thereby time their delivery relatively to the movements of the distributing device; substantially as described.

51. In a bottle capping machine, the combination of two capping heads, a bottle runway or passage terminating at a point adjacent to said heads, a distributer moving the bottles when discharged from said runway underneath one or the other of said heads, and devices at the delivery end of the run-way which engage the bottles to either hold them, or advance or retard them to thereby control the time of their delivery relatively to the movements of the distributer; substantially as described.

52. In a bottle capping machine, the combination of a capping head, a runway for delivering filled bottles in succession and in upright position to the capping machine, a moving device for mechanically moving bottles delivered from the runway into position to be acted upon by the capping head, a pair of bottle timing arms at the delivery end of the runway, and means for actuating said arms in time relation to the movements of said moving device to cause them to engage the bottles and hold them, advance them or move them back to thereby time their delivery relatively to the movements of the moving device; substantially as described.

53. In a bottle capping machine, a bottle-positioning device, comprising a pair of pivoted arms, said arms being arranged opposite each other, actuating gearing for said arms, and actuating connections between the gearing and said arms, said connections having a yielding element therein, said arms being arranged to operate upon the last bottle in the runway to control the time of its delivery by retarding, advancing, and temporarily holding it; substantially as described.

54. In a bottle capping machine, a capping head, a plunger for elevating the bottles to the action of the capping head, and a continuously moving rotary wiper for removing the capped bottles from the plunger, together with means for automatically connecting the wiper with and disconnecting it from its source of power; substantially as described.

55. In a bottle capping machine, two capping heads, a bottle elevating plunger below each head, means for placing alternate bottles on the two plungers, and a continuously moving device adjacent to each plunger for removing the capped bottles therefrom and means whereby said device may yield vertically and also be released from its driving mechanism under abnormal conditions; substantially as described.

56. In a bottle capping machine, a bottle elevating plunger, a bottle removing device adjacent to said plunger, driving means for said device, a releasable clutch for the driving means, and a guard for the said device, and guides for said guard to permit it to move vertically with the said device; substantially as described.

57. Cap feed mechanism, comprising a rotary drum having selecting means, and an independently rotatable friction member forming the outer closure for said drum; substantially as described.

58. A bottle-capping machine, a runway leading to the machine and arranged to deliver filled bottles thereto, and a timing device located at the delivery end of the runway and acting to either retard the last bottle thereon, or to move the same forward or backward according to the relative position of the bottle and timing device, said device having a yielding element; substantially as described.

59. A bottle capping apparatus comprising, a capping machine having a capping head, a carrier arranged to automatically receive filled bottles from a bottle filling machine and deliver them automatically in an upright position to a position on the table adjacent to the capping head, means for moving the successive filled bottles into line with the capping head, means for capping the bottles, together with means for engaging the bottles at the delivery end of said carrier to either hold them, advance them, or move them back to thereby control their time of delivery therefrom relatively to the action of said moving means; substantially as described.

60. A bottle capping apparatus comprising, a capping machine having a capping head, a carrier arranged to receive filled bottles from a bottle filling machine and automatically deliver them freely in an upright position to a distributing point on the capping machine, means for timing the delivery of the bottles from said carrier to said distributing point, and means for moving successive filled bottles from said distributing point to the capping head, other means for elevating the bottle to the action of the capping head, and a device for then removing the bottle from said action, and means for driving the filling machine synchronously with the capping machine; substantially as described.

61. A bottle capping apparatus comprising a capping machine, having two capping heads, a continuous moving carrier for automatically delivering filled bottles freely to a distributing point at the end of said carrier, means for timing the delivery of said bottles to said distributing point, means for moving filled bottles from said distributing point to one or the other of the capping heads, means for automatically deflecting filled bottles from a bottle filling machine onto said carrier, and means for driving the filling machine synchronously with the capping machine; substantially as described.

62. In bottle-handling and capping apparatus, a bottle carrier arranged to receive and deliver bottles in spaced relation to each other, a continuously moving conveyer which delivers the bottles freely to a timing station, means for automatically transferring the bottles from the carrier to the conveyer, a capping machine having capping mechanism and to which the bottles are automatically delivered by the conveyer, and means for timing the delivery of the bottles from the said timing station to the capping machine, substantially as described.

63. In bottle-handling and capping apparatus, a bottle carrier arranged to receive and deliver bottles in spaced relation to each other, a continuously moving conveyer arranged to deliver the bottles freely to a timing station, means for automatically transferring the bottles from the carrier to the conveyer, a capping machine having capping mechanism and to which the bottles are automatically delivered by the conveyer, and means for timing the delivery of the bottles from the said timing station to the capping machine, together with means for mechanically moving the bottles from their point of delivery from the conveyer upon the capping machine to the action of the capping mechanism, substantially as described.

64. In bottle-handling apparatus, a rotary bottle carrier arranged to receive and deliver bottles in spaced relation to each other, a capping machine driven in timed relation to the rotary carrier, and a conveyer which receives the bottles from the discharge of the carrier and delivers them freely to the capping machine and means adjacent to the point of delivery engaging the bottles to time their delivery, substantially as described.

65. In bottle-handling apparatus, a rotary bottle carrier arranged to receive and deliver bottles in spaced relation to each other, a capping machine driven in timed relation to the rotary carrier, and a conveyer which receives the bottles from the discharge of the carrier and delivers them freely to a timing station, timing means engaging the bottles at the timing station to time their delivery from said conveyer, together with means for mechanically transferring the bottles from their point of delivery from the conveyer, in position to be acted upon by the capping mechanism of the capping machine, substantially as described.

66. The combination with bottle-capping mechanism having a receiving table, of a bottle-runway leading to said table, a bottle carrier arranged to receive and deliver bottles in spaced relation, a continuously moving carrier operating in said runway to continuously receive the bottles from said carrier and deliver them to a distributing station, and means for transferring the delivered bottles successively to the different capping heads, together with means to engage the bottles adjacent to the distributing station and thereby time their delivery with respect to the movement of the transferring means, substantially as described.

67. In bottle-capping mechanism, a capping machine having capping mechanism and a movable device for transferring bottles to the action of the capping mechanism, a conveyer for delivering the bottles to the action of the transferring device, and mechanism operating adjacent to the point of delivery of the bottles to engage the bottles at different points on their periphery to either hold them or advance them, or move them backward, to thereby time their delivery with respect to the movements of the transfer device, substantially as described.

68. In bottle-handling and capping apparatus, a bottle carrier arranged to receive and deliver bottles in spaced relation to each other, a continuously moving conveyer arranged to deliver the bottles freely to a timing station, means for automatically transferring the bottles from the carrier to the conveyer, a capping machine having capping mechanism and to which the bottles are automatically delivered by the conveyer, means for timing the delivery of the bottles from the conveyer to the capping machine, and a driving connection between the capping machine and the rotary carrier, substantially as described.

69. In bottle-capping mechanism, a capping machine having capping mechanism and a movable device for transferring the bottles from a receiving station on the capping machine to the action of the capping mechanism thereof, a conveyer for delivering the bottles to said receiving station, and a device operating adjacent to the point of delivery to said station and arranged to engage the bottles to hold them or advance or move them backward, so as to time their delivery with respect to the movements of the transfer device, substantially as described.

70. Feeding mechanism of the character described, comprising a rotary selecting drum having an end closure whose plane is oblique to the rotary axis of the drum; substantially as described, 71. Feeding mechanism of the character described, comprising a rotary selecting drum having an end closure whose plane is oblique to the rotary axis of the drum, said closure being normally stationary but free to rotate with the drum under abnormal conditions; substantially as described.

72. In a machine for feeding and capping bottles, in combination with a capping mechanism, a feeding disk, a pair of capping plungers, means for removing bottles from the feeding disk, a resiliently arranged sorting finger for positioning the bottles alternately upon the capping plungers, means for alternately operating said plungers to coöperate with the capping mechanism, and means for removing the bottles from the plungers, substantially as and for the purpose described.

73. In a machine for feeding and capping bottles, in combination with a capping mechanism, a feeding disk, a pair of capping plungers, a sweeping finger for removing bottles from the feeding disk, a sorting finger for positioning bottles alternately on the capping plungers, means for alternately operating said plungers to coöperate with the capping mechanism and means for removing the bottles from the plungers, substantially as and for the purpose described.

74. In a machine for feeding and capping bottles, in combination with a capping mechanism and feeding means, a pair of capping plungers, a sorting finger adapted to move to and fro so as to position the bottles alternately upon the capping plungers, and means for operating said plungers to coöperate with the capping mechanism, substantially as and for the purpose described.

75. In a machine for feeding and capping bottles, in combination with a capping mechanism and feeding means, a pair of capping plungers, a resiliently arranged sorting finger for positioning the bottles alternately upon the capping plungers, means for operating said plungers to coöperate with the capping mechanism, and means for removing the bottles from the plungers, substantially as and for the purpose described.

In testimony whereof, I have hereunto set my hand.

EARL PORTER WETMORE.

Witnesses:
M. J. GAVIN,
GEO. E. POMEROY.